US006331890B1

(12) United States Patent
Marumo et al.

(10) Patent No.: US 6,331,890 B1
(45) Date of Patent: Dec. 18, 2001

(54) THICKNESS MEASURING APPARATUS, SUBSTRATE PROCESSING METHOD, AND SUBSTRATE PROCESSING APPARATUS

(75) Inventors: Yoshinori Marumo, Chino; Teruyuki Hayashi, Kofu, both of (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/474,126

(22) Filed: Dec. 29, 1999

Related U.S. Application Data

(63) Continuation of application No. PCT/JP99/00229, filed on Apr. 28, 1999.

(30) Foreign Application Priority Data

May 1, 1998 (JP) .................................................. 10-122231

(51) Int. Cl.[7] ...................................................... G01J 4/00
(52) U.S. Cl. ......................... 356/369; 356/630; 356/364; 414/255
(58) Field of Search ..................................... 356/369, 381, 356/382; 414/217, 216, 215; 118/719, 688, 500; 564/478; 437/8; 355/30, 53, 55

(56) References Cited

U.S. PATENT DOCUMENTS

| 5,387,309 | * | 2/1995 | Bobel et al. ........................... 118/688 |
| 5,552,327 | * | 9/1996 | Bachmann et al. ....................... 437/8 |
| 5,562,383 | | 10/1996 | Iwai et al. ............................. 414/217 |
| 5,700,127 | * | 12/1997 | Harada et al. ......................... 414/416 |
| 5,752,985 | * | 5/1998 | Nagafune et al. .................... 29/25.01 |
| 5,877,843 | * | 3/1999 | Takagi et al. ........................... 355/30 |
| 5,937,223 | * | 8/1999 | Akimoto et al. ....................... 414/225 |
| 6,004,047 | * | 12/1999 | Akimoto et al. ....................... 396/604 |
| 6,097,469 | * | 8/2000 | Yaegashi et al. ....................... 355/30 |

FOREIGN PATENT DOCUMENTS

| 54-73571 | 6/1979 | (JP) . |
| 1-222429 | 9/1989 | (JP) . |
| 6-216210 | 8/1994 | (JP) . |
| 9-283585 | 10/1997 | (JP) . |
| 10-82631 | 3/1998 | (JP) . |
| 10-303261 | 11/1998 | (JP) . |

* cited by examiner

Primary Examiner—Frank G. Font
Assistant Examiner—Sang H. Nguyen
(74) Attorney, Agent, or Firm—Pillsbury Winthrop

(57) ABSTRACT

A film thickness measuring apparatus is provided with a housing which is made up of a base plate and outer cases, and which substantially shuts off the internal region thereof from the outside air, an introduction stage on which a cassette C is mounted, the cassette containing a plurality of substrates which have thin films formed thereon, a measurement stage which is arranged inside the housing and on which the substrate is placed for measuring the film thickness of the thin film, and a conveyance mechanism, arranged inside the housing, for moving the substrates between the inside of the cassette and the measurement stage. A film thickness measuring mechanism is arranged inside the housing. The film thickness measuring mechanism comprises a light emitting mechanism and a detector. The light emitting mechanism includes a laser light source for emitting a laser beam to the thin film on a wafer placed on the measurement stage. The detector detects light reflected from the thin film. On the basis of the information detected by the detector, the film thickness measuring mechanism measures the thickness of the thin film in a non-contact manner. A filter unit is arranged in the housing and located above the measurement stage. Through this filter unit, pure air free of gaseous organic matter is supplied and guided to the region above the measurement stage.

18 Claims, 12 Drawing Sheets

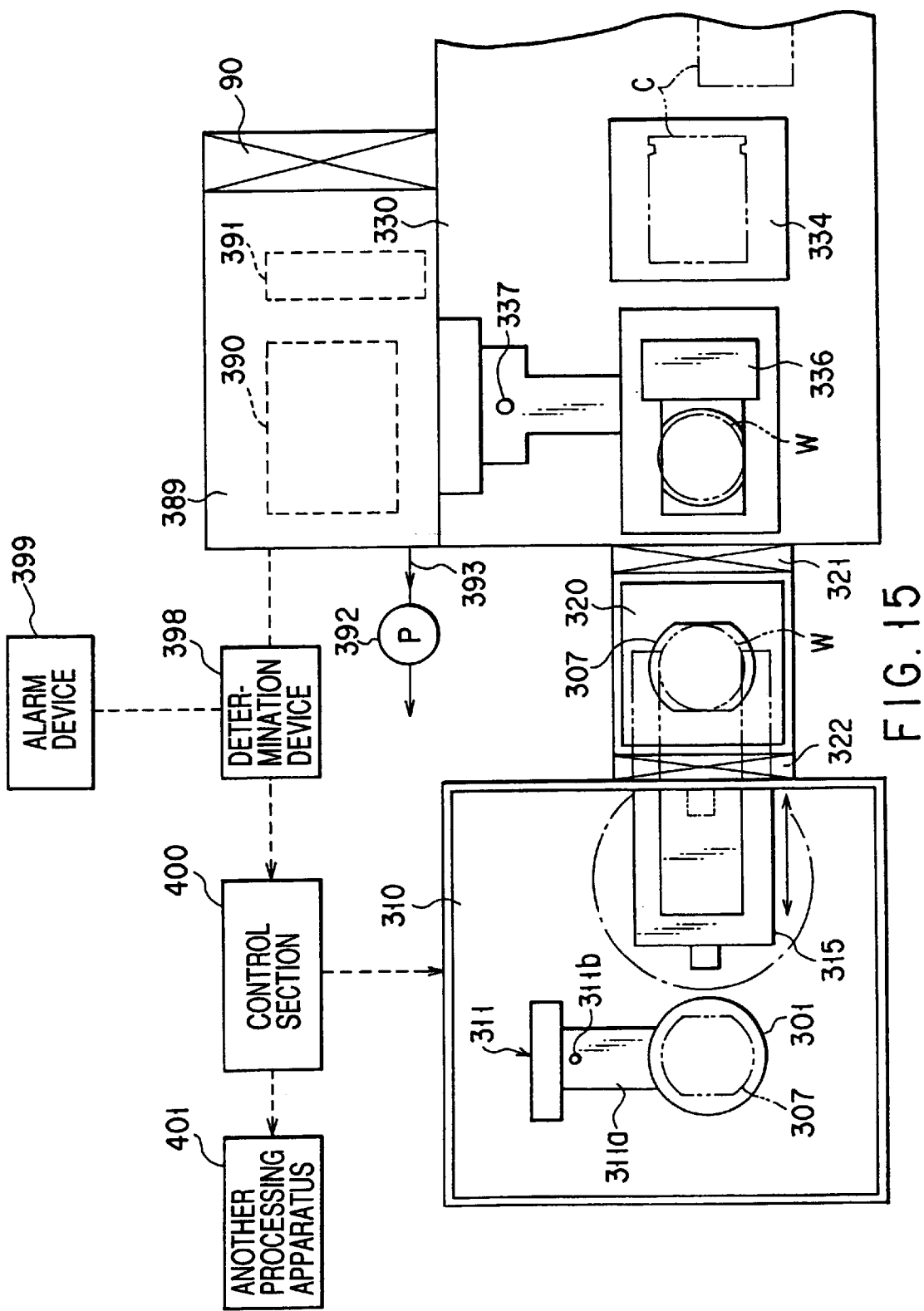
F I G. 15

THICKNESS MEASURING APPARATUS, SUBSTRATE PROCESSING METHOD, AND SUBSTRATE PROCESSING APPARATUS

CROSS REFERENCE TO RELATED APPLICATIONS

This is a continuation of Application No. PCT/JP99/0229, filed Apr. 28, 1999.

BACKGROUND OF THE INVENTION

The present invention relates to a film thickness measuring apparatus for measuring the thickness of a thin film formed on a substrate, such as a semiconductor wafer, and also to a substrate processing method and substrate processing apparatus that are provided with a film thickness measuring function.

In general, when a semiconductor device, such as an integrated circuit, is manufactured, desired circuit elements are formed by super fine working technology, with a film forming process, an etching process and other processes being repeated. With the recent development in technology, there is an increased demand for larger storage capacity and higher processing speed of microprocessors in the field of semiconductor devices. It is therefore necessary to provide developing devices having higher integration density and super fine structure.

Under these circumstances, the thickness control of films of various kinds has to be performed with high accuracy. By way of example, reference will be made to the gate oxide film of a transistor used in a microprocessor. When a thermal oxide film, with which to form the gate oxide film, is, for example, 20 nm, there is a thickness allowance of ± about 0.5 nm in the conventional art. In other words, the thickness variation within this range does not result in a change in the characteristics. In the next-generation devices, however, thin films which are 3 nm or less are required. In the case of such very thin films, the allowable thickness variation is less than ±0.05 nm, and highly accurate thickness control is therefore necessary.

One of the problems that has to be solved in connection with the thin films is related to measurement technology. Let us consider the case where a thin film is formed on a semiconductor wafer to have a predetermined thickness and is then measured by the same film thickness measuring apparatus. In this case, the measurement will gradually increase with time, and it is impossible to know the actual thickness of the thin film. For example, when a thermal oxide film having a thickness of 10 nm was formed on a semiconductor wafer and its thickness was measured several times after it was left to stand in a clean room, the results shown in FIG. 17 were obtained. FIG. 17 is a characteristic graph wherein the time (minutes) for which the film is left to stand after film formation is plotted against an abscissa, and the measured thickness (nm) is plotted against an ordinate. That is, FIG. 17 shows how the time is related to the measurement of the film thickness. In FIG. 17, the plotted white squares indicate data obtained by film thickness measuring apparatuses (FEIII) based on elliptical polarization method. In other words, they indicate how the measurement of the thickness of the thin film formed on the surface of the semiconductor wafer is dependent on the time. As is apparent from FIG. 17, the value measured after a lapse of 3 minutes is about 10 nm, which is a reliable value. However, the measurement value increases to about 10.1 nm when 30 minutes have passed from the film formation, and to about 10.3 nm when 300 minutes have passed.

As described, the next-generation devices, the allowable film thickness measurement variation range of which is ±0.05 nm or so, cannot be measured reliably.

As one of the factors that vary the film thickness measurement, organic matter attaching to the film surface is thought of. That is, the organic matter existing in the atmosphere of the film thickness measurement space attaches to the film surface with time. To prevent this attachment of organic matter, the conventional art, such as that disclosed in Jpn. Pat. Appln. KOKAI Publication No. 10-82631, proposes a film thickness measurement space which is provided inside an area separate from the outside air and which is filled with an inert gas, nitrogen gas.

According to this technology, the measurement space must be evacuated of the atmospheric gas and then filled with an inert gas instead. This being so, a large amount of gas is consumed in vain each time a semiconductor wafer is loaded or unloaded, which is uneconomic. In addition, safety measures must be taken, depending upon the kind of gas used.

Technology that employs a vacuum pump to reduce the pressure in a measurement space is known as technology that does not use an inert gas. However, this technology is disadvantageous in that the various driving mechanisms arranged in the measurement space must use a special kind of lubricant, such as vacuum grease, and the use of such lubricant inevitably increases the equipment cost.

Accordingly, the first object of the present invention is to provide a film thickness measuring apparatus which can measure the thickness of a film on a substrate with high accuracy, with no need to introduce an inert gas into a measurement space or to execute evacuation.

Another object of the present invention is to provide a substrate processing apparatus which can measure the thickness of a film on a substrate with high accuracy, ensures substantially stable measurement at all times, and can execute the next processing.

BRIEF SUMMARY OF THE INVENTION

After conducting intensive research on the factors that may vary the film thickness measurement, the present inventors discovered that impurities contained in the atmospheric gas, in particular, moisture and hydrocarbon, attach to the surface of a film on a semiconductor wafer, and thus vary the thickness of that film. Based on this discovery, the inventors have made the present invention.

A film thickness measuring apparatus according to the first aspect of the present invention comprises: a housing which substantially shuts off the internal region thereof from the outside air; an introduction stage on which a cassette is mounted, the cassette containing a plurality of substrates which have thin films formed thereon; a measurement stage which is arranged inside the housing and on which the substrate is placed for measuring the film thickness of the thin film; a conveyance mechanism, arranged inside the housing, for moving the substrates between the inside of the cassette and measurement stage; a film thickness measuring mechanism, arranged inside the housing, for emitting a measurement wave to the thin film on the substrate of the measurement stage, detecting at least one of a reflection wave and an emissive wafer from the thin film, and measuring the thickness of the thin film in a non-contact manner on the basis of detection information; and a filter mechanism, arranged in the housing, for capturing and removing gaseous organic matter from the outside air and supplying the outside air to at least the measurement stage.

In the apparatus described above, pure gas is supplied to the ambient atmosphere of the substrate on the measurement stage. Therefore, even where the thickness of the thin film can be measured after a long time has passed from the formation of that thin film, the variation which the measurement of the film thickness may undergo with time can be suppressed. It is preferable that the substrate be conveyed from the introduction stage to the measurement stage without being exposed to the outside air. The film thickness measuring means described above may include a light source for emitting a measurement wave and a detector for detecting a reflection wave. It is preferable that the film thickness measuring means further include a second exhaust duct which surrounds the light source and the detector and which serves to discharge the gas generated from the light source and the detector. With this structure, the gas generated by the light source and the detector is discharged through the second exhaust duct, the ambient atmosphere of the substrate on the measurement stage is purified further, and the variation which the measurement of the film thickness may undergo with time can be suppressed further.

Preferably, the film thickness measuring means is constructed by elliptical polarization analyzing apparatus that comprises: a light source; a polarizer for changing the light emitted from the light source into linearly polarized light; a 1/4 wavelength plate for changing the linearly polarized light into elliptically polarized light and causing this elliptically polarized light to be incident on a thin film obliquely; a detection section for detecting first elliptically polarized light reflected by the surface of the thin film and second elliptically polarized light reflected by the bottom face of the thin film; a mechanism for reading a phase difference angle and an amplitude ratio angle with respect to the first and second elliptically polarized lights detected by the detection section; and a mechanism for determining a film thickness on the basis of the read phase difference angle and amplitude ratio angle. Due to the use of the elliptical polarization analyzing apparatus (ellipsometer), it is desirable to employ the exhaust duct described above.

Preferably, the film thickness measuring means is constructed by a photoelectric spectroscope that comprises: an X-ray source for irradiating a film under measurement with an X-ray; a mechanism for counting photoelectrons emitted from the film, for each of energy levels; a mechanism for determining a film thickness on the basis of the number of photoelectrons counted.

It is preferable that the filter mechanism described above be constructed by a unit that comprises: a fan for sucking the air from a clean room; a chemical filter for capturing gaseous organic matter; and a ULPA filter. The fan, the chemical filter and the ULPA filter are arranged in the order mentioned. Desirably, the unit of this type is employed for purifying the air between the introduction stage and the measurement stage. In a preferred embodiment of the present invention, the conveyance space and the measurement space are filled with a pure gas which is supplied from the pure gas introduction section and contains a very small amount of impurities. Since, therefore, the amounts of impurities attaching to the surface of an object under examination, such as the amount of moisture and hydrocarbon attaching to the surface, are small, the measurement of a film thickness is stable without reference to the time that has passed from the film formation.

As the pure gas described above, it is desirable to use a dry gas having a dew point of −100° C. or lower. Since the gas is dry in this case, it is preferable that the pure gas introduction section be provided with an ionizer so as to prevent an introduced gas from being charged with static electricity.

It is preferable that the conveyance space and the measurement space be kept in the positive pressure state with reference to the external regions. In other words, the pressures in those spaces are kept higher than those in the external clean room regions, so as to prevent the gas in the clean room from flowing into the conveyance and measurement spaces. By keeping the spaces in the positive pressure state, they need not be completely sealed with reference to the external regions, and a high sealing characteristic is not required.

As the pure gas described above, an inert gas such as a nitrogen gas can be used. For purposes of the operator's safety, the inert gas may be mixed with a certain amount of oxygen. Moreover, the introduction stage may be provided with a lift. In this case, an object on which a thin film is formed is housed in a carrier, and the carrier is then housed in a sealed carrier box. If, in this state, the carrier is loaded by means of the lift, the object having a film thereon can be conveyed to the film thickness measuring apparatus, without the surface of the object being exposed to impurities.

A processing apparatus according to the second aspect of the present invention comprises: an introduction stage to which a substrate is introduced from an external region; a processing section for forming a film on the substrate on the basis of processing data; a conveyor mechanism for conveying the substrate from the introduction stage to the processing section; a measurement section for measuring the thickness of the film on the substrate which is placed in an controlled atmosphere; and a control section for controlling the processing data on the basis of data on the measured film thickness.

The apparatus of the second aspect measures the thickness of a film formed on a dummy wafer (dummy substrate) and uses the resultant measurement data for controlling the film formation conditions under which a film is actually formed on a wafer. Owing to this, a film having a desired thickness can be formed in a reliable manner.

According to the second aspect, a storage section is preferably employed, by which substrates loaded in a first introduction stage are kept in a controlled atmosphere, for batch processing of the substrates.

According to the third aspect of the present invention, there is provided a substrate processing method comprising the steps of: sequentially arranging a plurality of substrates on an introduction stage; forming a film on the substrate on the basis of processing data; measuring the thickness of the film on the substrate kept in an controlled atmosphere; controlling the processing data on the basis of data on the measured film thickness; and forming films on other substrates on the basis of the controlled processing data.

According to the fourth aspect of the present invention, there is provided a substrate processing method comprising the steps of: measuring the thickness of a film on substrate kept in an controlled atmosphere; controlling conditions of the next step on the basis of data representing the measured thickness; and processing the substrates on which the film is formed, under the controlled conditions.

In the two methods described above, it is preferable that the substrate to be processed be cleaned beforehand. The substrates may be processed either in a batch-processing manner or in a one-by-one manner. Further, the processing is not limited to film formation; various kinds of processing known in the art, such as heat treatment, diffusion processing, and ashing processing, may be executed. If the measurement data on a film thickness exceeds a given value, error information is desirably generated to notify the operator of this error.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a schematic plan view of the apparatus shown in FIG. 14.

DETAILED DESCRIPTION OF THE INVENTION

Preferred embodiments of the present invention will now be described with reference to the accompanying drawings.

Figure 1:
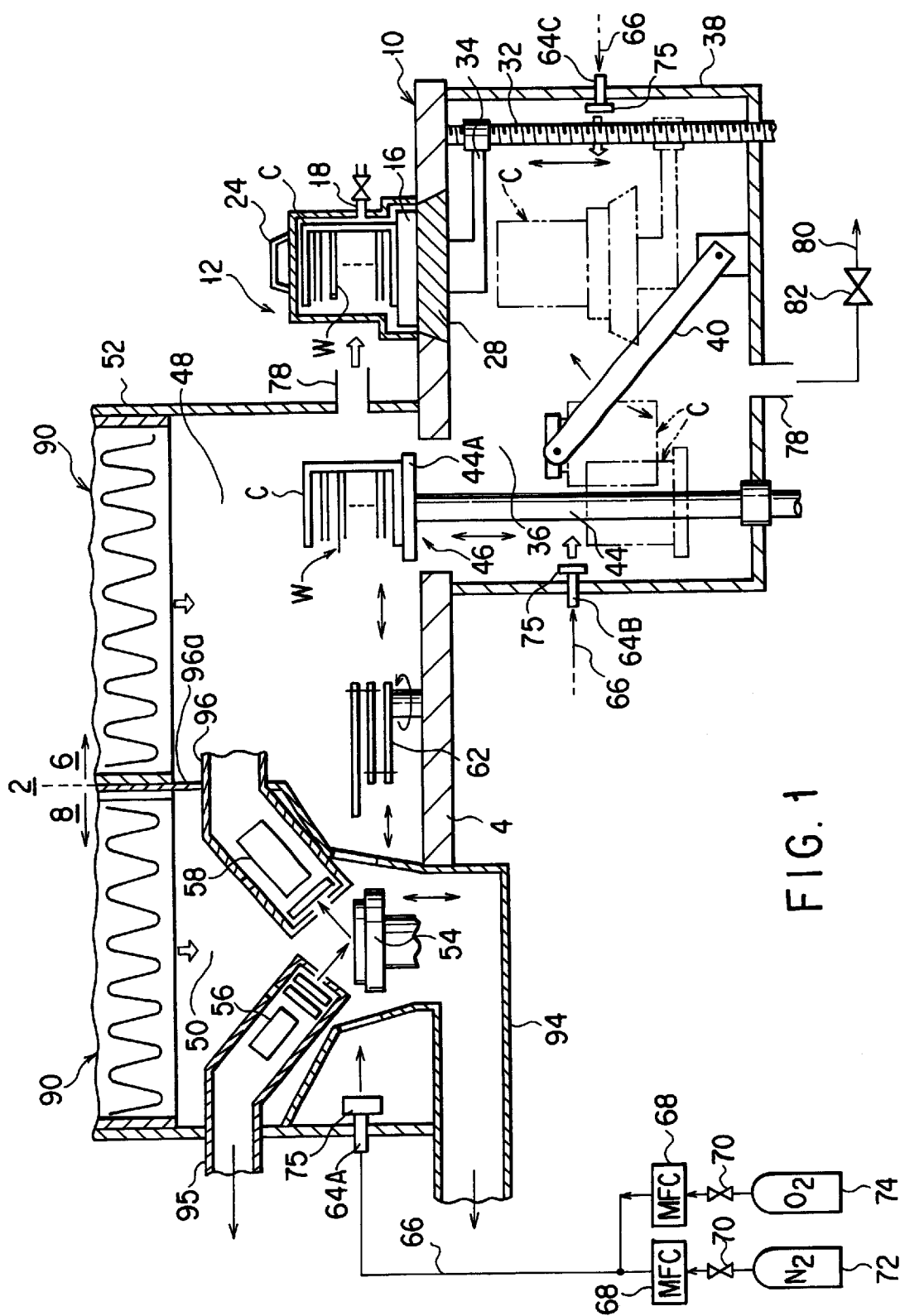
FIG. 1 is a schematic view of an entire film thickness measuring apparatus according to one embodiment of the present invention.

As shown in FIG. 1, a film thickness measuring apparatus 2 is arranged with reference to a clean room in such a manner that it is partly or entirely located inside that clean room. The apparatus 2 has a housing, and this housing is made up of outer cases 38 and 52 made of metallic plates, such as stainless steel plates, and a base plate 4 coupled to the outer case and arranged horizontally. The interior of the housing is hermetically sealed and substantially separate from the outside air. One outer cases 38 is either rectangular or circular and has an open top section. The upper end of this case is coupled to the lower surface of the base plate 4. Likewise, the other outer case 52 is either rectangular or circular and has open top and bottom sections. The lower end of this case is coupled to the upper surface of the base plate 4. The inside region of the housing is partitioned by a partitioning wall 96a, which supports a duct 96 to be described later. The right side of the partitioning wall 96a, as viewed in FIG. 1, is defined as a loading/unloading area 6 through which a semiconductor wafer W, i.e., a substrate to be inspected, is loaded or unloaded to external regions. The left side of the partitioning wall 96a, as viewed in FIG. 1, is defined as a measurement area 8 in which the thickness of a film is measured. In other words, the partitioning wall 96a divides the interior of the upper outer case 52 into a wafer conveyance space 48 and a wafer measurement space 50. A cassette conveyance space 36 is defined inside the lower outer case 38.

Fan filter units 90, which serve as filter means, are arranged in the open top section of the upper outer case 52 in such a manner that they are located in the upper regions of the wafer measurement space and the wafer conveyance space, respectively. By means of these fan filter units 90, the open top section of the upper outer case 52 is closed. Pure gas introduction sections 64A, 64B and 64C, each having a gas supply nozzle 75, are provided for one side wall of the measurement space of outer case 52 and a pair of opposing side walls of outer case 38. The pure gas introduction sections introduce gas. In cooperation with the exhausting means described later, the introduced pure gas controls the atmosphere of the wafer measurement space 50, the cassette conveyance section 36 and the wafer conveyance space 48 (which communicates with the measurement space 50). The pure gas is, for example, a mixture of pure $N_2$ gas and pure $O_2$ gas, and this mixture gas is supplied into the spaces 36, 48 and 50 at given adjusted flow rates. The supply nozzle 75 of each gas introduction section is connected to both an $N_2$ gas cylinder 72 and an $O_2$ gas cylinder 74, i.e., pure gas supply sources, by way of a gas introduction tube 66, which is provided with mass flow controllers 68 and opening/closing valves 70. (The mass flow controllers 68, the opening/closing valves 70, the $N_2$ gas cylinder 72 and the $O_2$ gas cylinder 74 are provided for each introduction tube 66 in a similar manner, and those corresponding to one gas introduction tube 64A are shown and those corresponding to the other tubes 64B and 64C are not shown.) Gas cylinder 72 contains an industrially pure $N_2$ gas, while gas cylinder 74 contains an industrially pure $O_2$ gas. The pure $N_2$ gas and the pure $O_2$ gas are mixed in the supply tubes 66 at a given mixing ratio, and are then supplied to the respective spaces by way of the gas introduction sections 64A, 64B and 64C. The pure gas need not be limited to the kind described above, and may be another single-element gas or mixture gas. For example, an inert gas such as $N_2$ gas may be used. When the safety of the operator is taken into consideration, a mixture gas consisting of an inert gas and a certain amount of oxygen can be used. Exhaust ports 78 are formed in the outer cases 38 and 52 in such a manner that atmospheric gases can be discharged from the cassette conveyance space 36 and the wafer conveyance space 48 independently or in relation to each other. The exhaust ports 78 are connected to an exhaust passage 80, which in turn is connected to a factory's exhaust system. (For simplicity only the exhaust passage 80 that is connected to the exhaust port 78 of the cassette conveyance space is shown in the drawings, but it can be readily understood that the other exhaust port is connected to a similar exhaust passage.) To cope with pressure fluctuations of the factory's exhaust system, the exhaust passage 80 is provided with an automatic pressure adjusting valve 82. Preferably, the exhaust port 78 of the wafer conveyance space 48 is located at a position farthest from the measurement space 50, and particles and other undesirable substances produced in the wafer conveyance space 48 are removed through the exhaust port 78. Inside the wafer conveyance space 48, pure air is made to flow downward from the upper region thereof, and is also made to flow from the measurement space 50 to the exhaust port 78 of the wafer conveyance space 48. Owing to these air flows, particles or other kinds of foreign matter do not enter the measurement space 50 from the wafer conveyance space 48. Either a vacuum pump provided in the factor's exhaust system or the exhaust passage 80 is employed for discharging gases through the exhaust port 78.

The inflow amount of gas and the outflow amount of gas discharged from the exhaust port 78 are preferably determined in such a manner that the pressures in the spaces 36, 48 and 50 are slightly higher than the outside pressure of the housing. In other words, the pressures in the spaces 36, 48 and 50 are kept in the positive pressure state, thereby preventing gases from flowing into the spaces from the outside clean room. As long as the interior of the housing is in the positive pressure state, the housing need not be completely sealed with reference to the outside regions. Therefore, the housing does not require a high sealing characteristic. A wafer conveyance mechanism 62 (i.e., a substrate conveyance mechanism) is provided on the base plate 4 such that it is located inside the wafer conveyance space 48. In the present preferred embodiment, the wafer conveyance mechanism receives a semiconductor wafer from a cassette described later, conveys it into the measurement space 50, and, after measurement, conveys the wafer from the measurement space back into the cassette. To enable this operation, the wafer conveyance mechanism is provided with: a support member which is linearly movable on the base plate 4; and an arm section which is extensible and rotatable with reference to the support member and capable of supporting the wafer. In the present invention, the term "substrate conveyance mechanism" is not intended to refer to a mechanism for moving a wafer with reference to a cassette but to a mechanism capable of conveying the cassette itself. In other words, the substrate conveyance mechanism may be designed to include a conveyance arm mechanism 40 and a lift mechanism 46.

Figure 3:
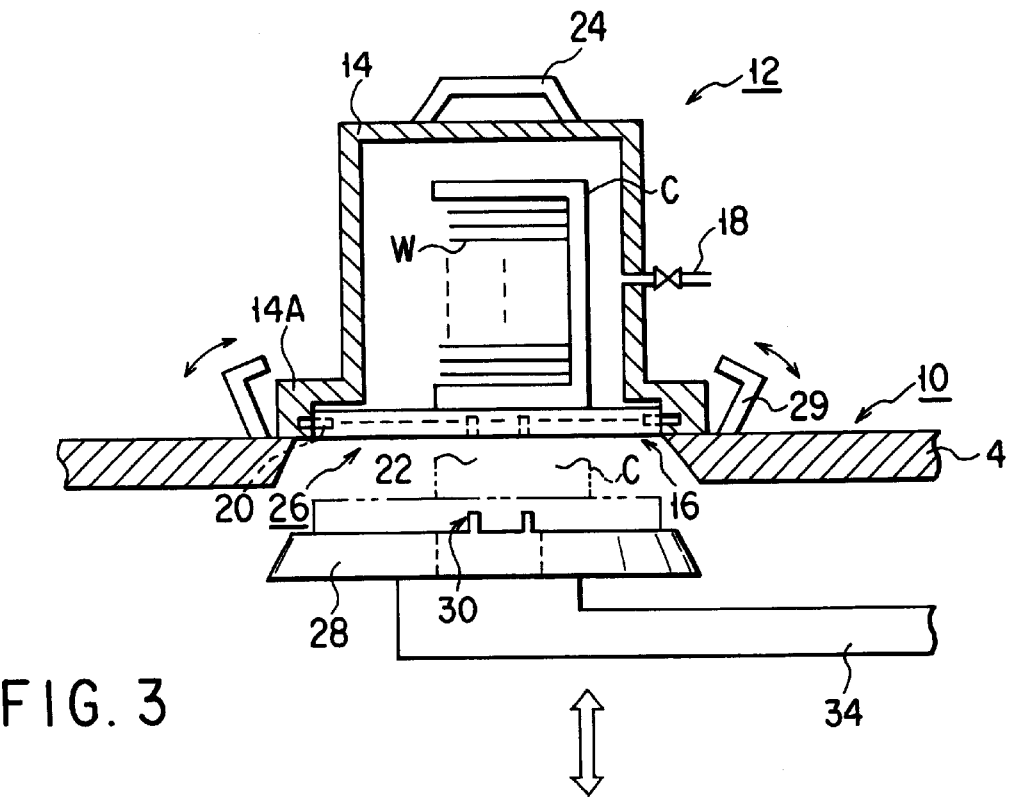
FIG. 3 is an enlarged view showing part of FIG. 1 and illustrating a state where a carrier box and a lifting arm are located on an introduction stage.

The right end of the base plate 4, i.e., the plate portion located above the outer case 38, is designed to serve as an introduction stage 10 from which a wafer W is introduced. On this introduction stage 10, a sealed carrier box 12 is placed by the operator or an automatic conveyance apparatus (not shown). The sealed carrier box 12 contains a cassette C, in which a large number of semiconductor wafers W are arranged horizontally, with the same intervals maintained in the vertical direction, as shown in detail in FIG. 3.

Broadly speaking, the sealed carrier box 12 comprises: a container main body 14 having an opening in the bottom thereof; and a container bottom 16 with which the opening can be hermetically sealed. The shape and volume of the container main body 14 are determined in such a manner that the entirety of one cassette C can be stored in a state hermetically sealed from the outside. The opening of the bottom of the container body has such dimensions as enables the cassette C to be located or unloaded with reference to the container main body 14. The bottom 16 is made of a rectangular or circular flat plate which is slightly smaller than the opening of the main body 14. By means of a lock mechanism to be described later, the bottom 16 is engageable with the lower portion of the container main body in a removable manner. In other words, the opening of the container main body can be opened or closed by the bottom 16.

The sealed carrier box 12 can be filled with a highly-clean pure gas such that the pressure in the sealed carrier box 12 is positive with reference to the outside pressure in a state where cassette C is stored. To enable this, the container main body 14 is provided with a gas introducing/exhausting section 18, which is removably coupled to a gas supply tube connected to a pure gas cylinder (not shown) and through which the pure gas is introduced into the container man body 14. A handle 24 is provided on the top of the container main body 14, and the container main body 14 is held with that handle 24.

The container bottom 16 is hermetically attached to a lower flange 14A, which defines the opening of the container main body 14, by use of a seal member (not shown), such as an O-ring. Lock pins 20, which can protrude outward, are provided at several positions on the circumference of the container bottom 16. The lock pins 20 are urged by means of springs (not shown), in such a manner that the tip ends of the lock pins 20 do not protrude from the outer circumference of the container bottom 16. A rotatable link mechanism 22 is provided for the center of the container bottom 16 such that it is rotatable with reference to the bottom on a vertical axis. The outer circumference of the mechanism 22 constitutes a cam surface, with which the proximal portions of the lock pins are in contact. With this structure, when the link mechanism is rotated, the tip ends of the lock pins protrude from the outer circumference of the container bottom against the urging force of the springs. The protruding portions of the lock pins are inserted into holes formed in the inner circumference of the flange 14A. As a result, the container bottom 16 is locked with reference to the container main body 14, as described above. It should be noted that the lock mechanism described so far is nothing but an example, and it can be readily understood that lock mechanisms of various types can be employed.

The container main body 14 and container bottom 16 described above are formed of a polypron resin or the like. They can be made of a cover box-like SMIF-POD (trademark) disclosed in Jpn. Pat. Appln. KOKAI Publication No. 1-222429, but is not limited to this, needless to say. A plurality of wafers, e.g., twenty-five wafers W, can be stored in the cassette C at one time.

A cassette passing hole 26 is formed in the introduction stage 10 in such a manner that it corresponds in position to the opening of the bottom of the container main body 14. The passing hole 26 is defined by a tapered circumferential wall, by which the diameter of the hole 26 decreases in the upward direction. The diameter of the uppermost portion of the hole 26 is greater than the inner diameter of the flange 14A of the box 12, but is smaller than the outer diameter of the flange 14A. In other words, the hole 26 has such dimensions as enable passing of one cassette C. A vertically movable table 28 can be inserted into the passing hole 26, and the outer circumference of that table is tapered substantially at the same angle as the circumferential wall that defines the passing hole. To put it briefly, the passing hole 26 can be opened or closed by the vertically movable table 28. Rotating pins 30, which are engageable with the rotatable link mechanism 22 of the container bottom 16, are provided in the center of the vertical movable table 28. When the table 28 is located at the uppermost position and closes the passing hole, the rotating pins 30 come into engagement with the rotatable link mechanism 22 and rotate the link mechanism in accordance with the rotation of the table 28. Accordingly, either the locking function or the unlocking function of the locking mechanism can be selectively accomplished. The table 28 may be realized by either electric means or cam means. In the case where the electric means is employed, an electric motor, which is connected to rotate the table, is provided for a vertically movable arm 34 used for supporting the table. An electric switch, which is closed when the table comes into contact with the container bottom 16, is provided for the table. The motor and the electric switch are connected to a power source, so that the motor can be rotated when the switch is closed. In the alternative case, the cam means is provided in such a manner that the table can be rotated by utilization of the lifting force of the table when it comes into contact between the upper surface of the table 28 and the upper surface of the container bottom 16.

A plurality of lock arms 29 are arranged on the introduction stage 10. The lock arms 29 are located around the circumference of the cassette passing hole 26 and arranged at predetermined intervals. Each of the lock arms 29 is an L-shaped member made up of: a vertical arm portion which is pivotally supported at the proximal end; and a horizontal arm portion which extends from the distal end of the vertical arm portion substantially at right angles thereto. As indicated by the arrow, each arm 29 is swingable along a vertical surface. When each arm 29 is manually rotated and its vertical arm portion becomes vertical, the lower face of the horizontal arm portion and the upper face of the flange 14A come into contact with each other. As a result, the flange is locked, thereby fixing the container to the stage 10.

In this manner, fixing is performed.

The vertically movable arm 34 supports the table 28 at the free end thereof and has a screw hole at the proximal end thereof. The screw hole is in threadable engagement with a ball screw 32. The ball screw 32 extends in the vertical direction, and is rotatably supported by both the introduction stage 10 and the bottom wall of the outer case 38. The lower end of the screw 32 is outwardly projected from the bottom wall, and is connected to a reversible electric motor (not shown). A guide rod (not shown) is secured to the case 38 such that it is parallel to the screw 32. The guide rod extends through a vertical hole formed in the movable arm 34. When the ball screw 32 is rotated by the motor, the movable arm 34 moves along the screw 32 in a horizontal state, and the table 28 moves in the same way. By this movement, the table 28 vertically moves in such a manner that the container bottom 16, on which the cassette C is mounted, is supported on the table. Accordingly, the cassette C is moved between the carrier box 12 and the conveyance space 36.

A cassette conveyance arm 40 is provided inside the cassette conveyance space 36. The proximal end of that arm 40 is pivotally supported by the bottom of the outer case 38 in such a manner that the arm 40 is swingable around a horizontal axis. By means of a motor (not shown), the arm 40 is swingable between a vertical position, where the arm is substantially upright as indicated by the solid lines in FIG. 4, and a declined position, where the arm is declined as indicated by the two-dot-dash lines in FIG. 4. An arm auxiliary member 40A is at the distal end of the conveyance arm 40. The arm auxiliary member 40A hangs, so that its horizontal state is maintained at all times without reference to the position of the arm. A pair of claws 42, which can move closer to or away from each other, are provided at the both ends of the member 40A. When the arm 40 is at either the vertical position or the declined position, the claws are moved closer to or further away from each other. With the upper side wall portions being clamped with the claws, the cassette C is held by the auxiliary member 40A.

As shown in FIG. 1, a passing hole 46 is formed in the upper wall of the outer case 38, i.e., in the part of the base plate 4. Through the passing hole 46, the cassette conveyance space 36 and the waver conveyance space 48 communicate with each other. A set elevator 44, which has an elevator table 44A at the upper end, is provided for the bottom wall of the outer case 38. The elevator 44 is vertically movable by a driving mechanism (not shown), and the elevator table 44A is movable between a lower limit position where it receives a cassette C thereon and an upper limit position where it is inside the wafer conveyance space 48. The elevator table 44A moves through the passing hole 46 when moving toward the upper limit position. (At the upper limit position, the elevator table 44A can be adjusted in vertical position, so that wafer can be sequentially taken out from the cassette by the conveyance arm mechanism, or wafer subjected to film measurement can be sequentially inserted into the cassette.) The elevator table 44A can be moved to the selected one of the above two positions and stay there.

When the conveyance arm 44 is at the vertical position, it is near the vertically movable table 28 located at the lowermost position. When it is at the declined position, it is near the elevator table 44A located at the lower limit position. To enable this, the dimensions of the mechanisms described above are determined, and the mechanisms are arranged. When film thickness measurement is performed, the conveyance arm mechanism operates such that the cassette C on the vertically movable table 28 located at the lowermost position is clamped by the claws 42 of the arm auxiliary member 40A. Then, the cassette C is conveyed to the region above the elevator table 46 located at the lower limit position, and is allowed to fall onto the elevator table 46. By means of the arm auxiliary member 40A, the cassette C that stores wafers subjected to film thickness measurement is conveyed from the elevator table 44A located at the upper limit position to the region above the vertically movable table 28 and is then allowed to fall on the table 28 by following procedures opposite to those described above, as is obvious to those skilled in the art.

The measurement space 50 will be described specifically, referring to FIG. 2.

In the lower region of the measurement space 50, the large-diameter inlet of a duct 94, which serves as a second exhaust means, is provided. The duct 94 communicates with the factory's exhaust system line 80. The duct 94 penetrates the base plate 4, and the outlet of the duct 94 is located outside the housing and connected to the factory's exhaust system line 80. The large-diameter inlet of the duct is shaped like a funnel, and the diameter of the inlet increases in the upward direction. A measurement stage 54 is arranged inside the large-diameter inlet of the duct 94. In other words, the measurement stage 54 is surrounded by the tapered circumferential wall of the upper portion of the duct. The measurement stage 54 comprises: a vacuum suction mechanism (not shown) for holding a wafer W by suction; and a lift mechanism (not shown) for vertically moving the stage, as indicated by the arrow, so as to adjust the level of the measured surface of the wafer. In the circumferential wall of the upper portion of the exhaust duct 94, two openings 94a and 94b are formed in such a manner that they are opposed to each other. It is preferable that the centers of these openings be substantially at the same level as the upper surface of the measurement stage 54. One of the openings, namely opening 94a, is close to the outlet port of the gas supply nozzle 75. Through that opening 94a, the pure gas supplied from the nozzle 75 is jetted to the side portions of the wafer W placed on the measurement stage 54 in a substantially linear manner. The other opening 94bcommunicates with the wafer conveyance space 48, as shown in FIG. The dimensions of the second opening 94b are determined in such a manner that the conveyance arm mechanism 62 can move the wafer W into the duct 94 or move it away from it. In this manner, the opening 94b enables the pure gas to be discharged, and further enables the wafer to be conveyed between the wafer conveyance space and the measurement space. The duct wall in which the opening 94b is formed is preferably integral with the partitioning wall 96b or coupled thereto.

Figure 2:
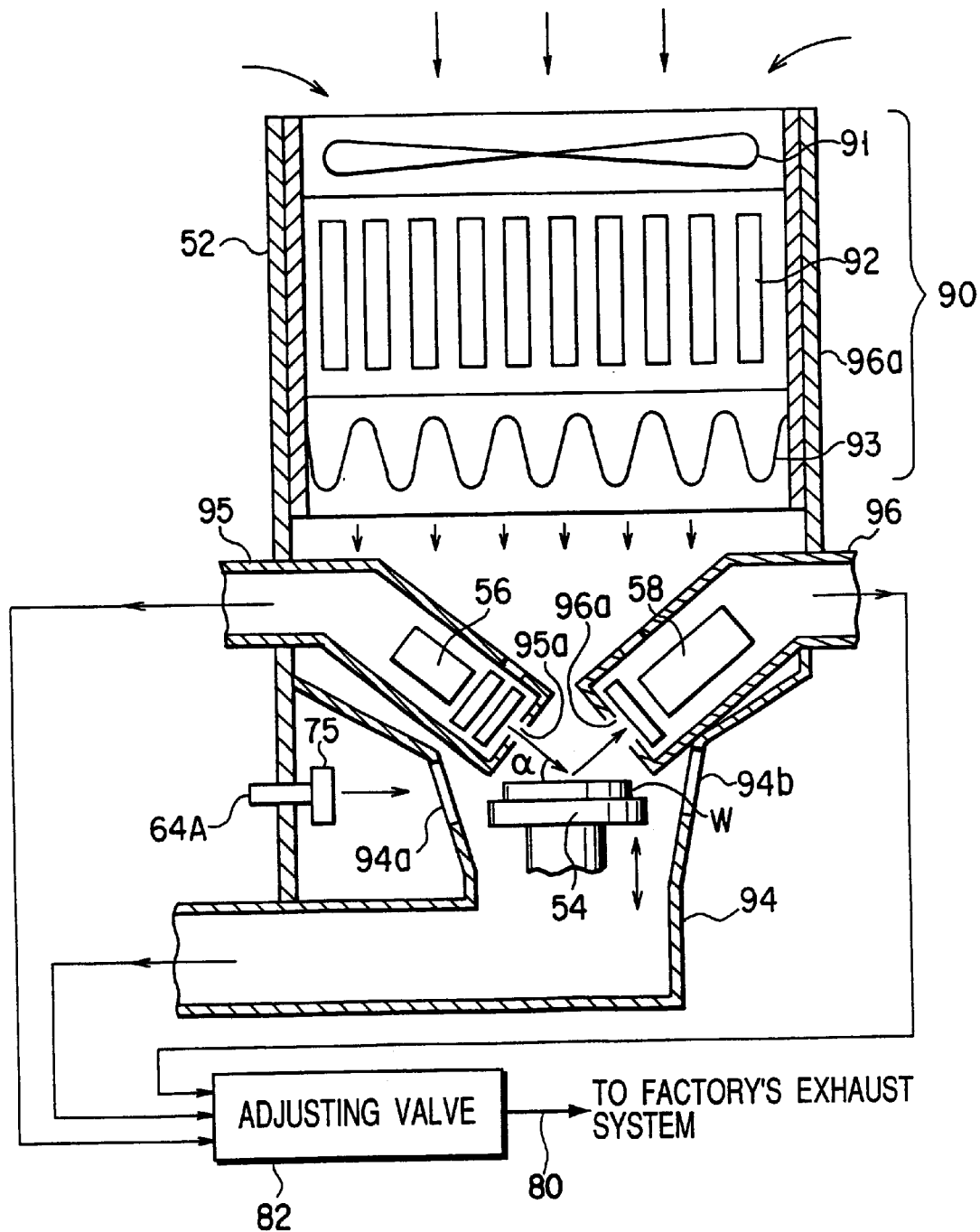
FIG. 2 is an enlarged view showing part of FIG. 1 and illustrating how the atmosphere in a measurement chamber is controlled.
Figure 8:
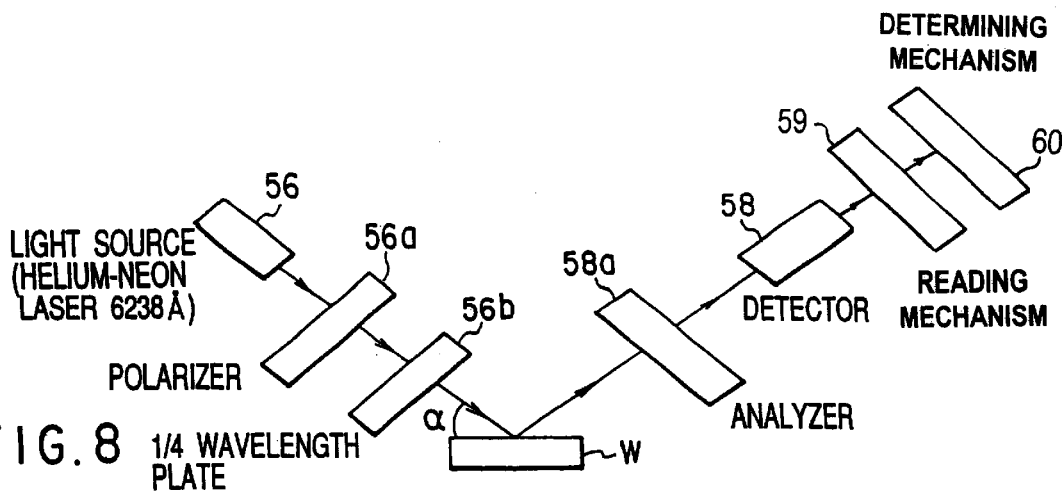
FIG. 8 is a view showing the film thickness measuring mechanism employed in the apparatus shown in FIG. 1, and schematically illustrating how the film thickness measuring mechanism (ellipsometer) utilizes an elliptical polarization.

As shown in FIG. 2, the laser source 56 of an elliptical polarization-based film thickness measuring apparatus (ellipsometer), which serves as a film thickness measuring means, is arranged at a position which is on one side of the measurement stage 54 and diagonally above that stage 54. A laser beam is incident on the to-be-measured surface of the wafer W at angle α of incidence. A detector 58 is arranged at a position which is on the other side of the measurement stage 54 and diagonally above the stage 54. The detector 58 detects reflected light reflected by the thin film. As shown in FIG. 8, a polarizer 56a and a ¼ wavelength plate 56b are arranged between the light source 56 and the substrate W to be measured. An analyzer 58a is arranged between the detector 58 and the substrate W.

The light source 56, the polarizer 56a and the ¼ wavelength plate 56b are arranged in one end of a duct 95 communicating with the factory's exhaust system line 80, and are surrounded by the circumferential wall of the duct. One end of the exhaust duct 95, which constitutes part of the first exhaust means, is closed with a lid having a small hole 95a (FIG. 2). Through the small hole 95a, the laser beam from the duct is incident on the wafer w placed on the measurement stage 54. On the other hand, the detector 58 and the analyzer 58a are arranged in one end of another duct 96 communicating with the factory's exhaust system line 80, and are surrounded by the circumferential wall of the duct. The open end of the exhaust duct 96, which constitutes the first exhaust means together with the duct 95 described above, is also closed with a lid having a small hole 95a. Through the small hole 96a, the reflected laser beam is incident on the analyzer 58a. A transparent glass plate is fitted in each of the small holes 95a. Each of the tip ends of the ducts 95 and 96 is provided with one or more exhaust ports, though these ports are not necessarily required where the small holes 95a are formed. It is preferable that the exhaust ports be as close as possible to the measurement stage 54. For example, they can be formed in the housing. Through the exhaust ports and/or the small holes, the gas in the measurement space is exhausted into the ducts 95 and 96.

Next, the fan filter units 90 arranged above the film thickness measuring area 8 will be described, and air streams in the measurement space 50 will be described.

The fan filter unit 90, serving as filter means, is located above the film thickness measuring area 8. From the fan filter unit 90, pure air is supplied in such a manner that the air flows from the upper region to the lower region of the measurement space 50. To be specific, the unit 90 is provided such that it closes the space between the upper portion of the left side of the outer case 52 and the upper portion of the partitioning wall 96a. As shown in FIG. 2, the fan filter unit 90 comprises an upper fan 91, a chemical filter 92, and a ULPA filter 93. These structural elements are stacked in the order mentioned, and a one unit structure is formed thereby. The unit is removably attached to the upper end of the housing. The upper fan 91 is connected to a power supply in a known method, and is electrically rotated. Owing to the rotation of the fan, the highly-pure air of the clean room, in which the film thickness measuring apparatus is arranged, is drawn into the filter. The drawn air is first cleared of organic substances by the chemical filter 92, and is then cleared of particles by the ULPA filter 93. Thereafter, the air flows into the measurement area 50. The downward stream of pure air, produced in this manner, does not cause eddy currents, and the air flows down into the measurement space 50 quietly from the fan filter unit 90. The air enters the ducts 94, 95 and 96 arranged in the lower region, so that they are discharged or circulated. The fan filter unit 90, serving as the filter means, is required in the measurement area 8, but it is preferably provided in the loading/unloading area 6 as well, as shown in FIG. 1. This is because the conveyance arm mechanisms 40, 46 and 62, which serve as the substrate conveyance means and are likely to produce particles, are arranged in the loading/unloading area 6.

The chemical filter 92 of the fan filter unit 90 is made mainly of a special type of filter element, and this element is formed on a substrate and effective in capturing organic substances that do not easily evaporate after attaching to a film. Examples of such organic substances include phosphoric ester, phthalic acid, siloxane, fatty acid ester, BHT, etc. The ULPA filter 93 is mainly made of a filter element specially designed for capturing fine particles.

As the filter element of the chemical filter 92, a honeycomb type having fibrous or powder active carbon is employed. The powder active carbon may be comparatively large spherical particles, fine spherical particles, or particles of any other shape. The active carbon can be manufactured in any of the methods available. Of various kinds of active carbon, the fibrous type and the fine spherical particle type are effective in removing organic substances. Although these types of active carbon are small in pressure loss, they do not withstand long use. Therefore, they are desirably used for removing low-density organic components (density: 100 to 1 ppb). On the other hand, the active carbon of comparatively large-diameter spherical particles withstands long use, but this type of active carbon is low in substance removing characteristic and causes a large pressure loss. This type of active carbon is preferably used for removing organic components of high density (100 ppb).

Table 1 shows four types of chemical filters coe, the fiber diameters of the filter elements of samples A-7, A-10, A-15 and A-20 are 18 μm, 17 μm, 15 μm and 13 μm, respectively, and the specific surface areas of them are 700 m$^2$/g, 1000 m$^2$/g, 1500 m$^2$/g and 2000 m$^2$/g.

TABLE 1

| Item | Unit | Type of chemical filters | | | |
|---|---|---|---|---|---|
| | | A-7 | A-10 | A-15 | A-20 |
| Fiber diameter | μg | 18 | 17 | 15 | 13 |
| Specific surface area | m²/g | 700 | 1000 | 1500 | 2000 |
| Small-hole diameter | nm | 1.7 | 2.0 | 2.1 | 2.2 |
| Amount of toluene adsorbed | % | 22 | 33 | 62 | 84 |
| pH | — | 7 | 7 | 7 | 7 |
| Burning point | °C. | 480 | 480 | 480 | 480 |
| Strength | Kg/cm² | 20 | 20 | 15 | 10 |
| Ductility | % | 1.0 | 2.0 | 2.0 | 2.0 |
| Elastic modulus | Kg/cm² | 1200 | 800 | 600 | 450 |

From the Table above, it can be understood that the fiber diameter should be as small as possible and the specific surface area should be as wide as possible, so as to adsorb a large amount of toluene and to thereby improve the removal efficiency.

As described above, according to the film thickness measuring apparatus of the present embodiment, the cassette conveyance space 36, the wafer conveyance space 48 and the measurement space 50 are surrounded by the outer cases 38 and 52 and isolated from the outside air. In addition, the exhaust ducts 94, 95 and 96, serving as cover members, are arranged inside the film thickness measuring area 8. With the air in the neighborhood of the wafer W under measurement being discharged from the ducts, pure air is drawn in from above through the fan filter unit 90. Accordingly, the atmosphere in the spaces 36, 48 and 50 is very pure and hardly contains impurities. Further, the gas introduction sections 64A, 64B and 64C are arranged such that they are located near the duct 94 and at predetermined positions on the outer cases 38 and 52. To be more specific, one pure gas introduction section is provided in the side wall of the measurement stage 54, and the others are provided in the facing side walls of the cassette conveyance space 36. From those gas introduction sections 64A, 64B and 64C, pure gas is introduced into the spaces 36, 48 and 50. As a result, the atmosphere in the spaces 36, 48 and 50 are very pure, and the amount of impurities contained in the spaces is extremely small. Needless to say, the number of pure gas introduction ports provided and the locations where they are arranged are not limited to those described above.

In terms of the particles contained, the pure gas to be used is as clean as possible like the pure gas in a clean room. In addition, the pure gas is controlled to contain an extremely small amount of moisture or organic substances, since this would a cause of fluctuations in the measurements of film thickness. In regard to the moisture, it is desirable that the dew points of both gases be −100° C. or less. When producing the pure gas, the mixing ratio of the nitrogen gas to the oxygen gas is desirably 4:1, which is substantially equal to that of the atmospheric air, since that mixing ratio is desirable for ensuring safety of human beings.

The gas supplied from the pure gas introduction sections 64A, 64B and 64D is dry, and the amount of moisture is extremely small. Since the dry gas is therefore likely to be charged electrostatically, ionizers 75 are attached in the neighborhood of the pure gas introduction sections 64A, 64B and 64C, so as to neutralize the electrostaticity.

An introduction stage 220 according to another embodiment will now be described with reference to FIGS. 5 and 6.

The introduction stage 220 of the embodiment does not receive such a carrier box as described above. It receives a wafer cassette C and takes a wafer W from the cassette, for loading. A lid is provided to close the side opening of the wafer cassette C, and the wafers inside the cassette C are isolated from the outside air. The introduction stage 220 has two support tables, i.e., upper and lower support tables 225 and 237, and these two support tables 225 and 237 are coupled together by means of four stays in such a manner that they are vertically separated by a predetermined distance. Cassette tables 226 and 238 are provided on the respective tables 225 and 237 in such a manner as to be horizontally movable. A cassette C is placed on each of the cassette tables 226 and 238. In the state where the cassette is placed, its lid 230 or 239 is vertical.

The support tables 225 and 237 are supported by a lift cylinder mechanism to be vertically movable. The lift cylinder mechanism is constructed by a cylinder 242, and a rod 241 (FIG. 6) which is vertically movable relative to the cylinder. The upper end of the cylinder 242 is supported by the support table 225, and the lower end of the rod 241 is supported by a support portion, which is projected rearward from the lower end of a partitioning wall 228. When the rod 241 is retracted into the cylinder 242 by controlling the pressure medium in the cylinder, the cylinder moves down. As a result, the introduction stage 220 moves down, and the lid 239 of the upper cassette C comes to the position corresponding to an opening 227 formed in the partitioning wall 228. When the rod 241 is made to protrude from the cylinder 242, the introduction stage 220 moves up. As a result, the lid 230 of the lower cassette C comes to the position corresponding to the opening 227 of the partitioning wall 228.

A lid-detaching mechanism 224 is provided on the front surface of the partitioning wall 228 at a position lower than the opening 227. The lid-detaching mechanism 224 is provided with: an arm 229; a holder 223 attached to the upper portion of the arm 229; a mechanism (not shown) for vertically moving the arm 229; a mechanism (not shown) for swinging the arm 229 to and from; a lid unlocking mechanism (not shown) provided on the holder 223; and a lid-holding mechanism (not shown) provided for the holder 223.

Figure 5:
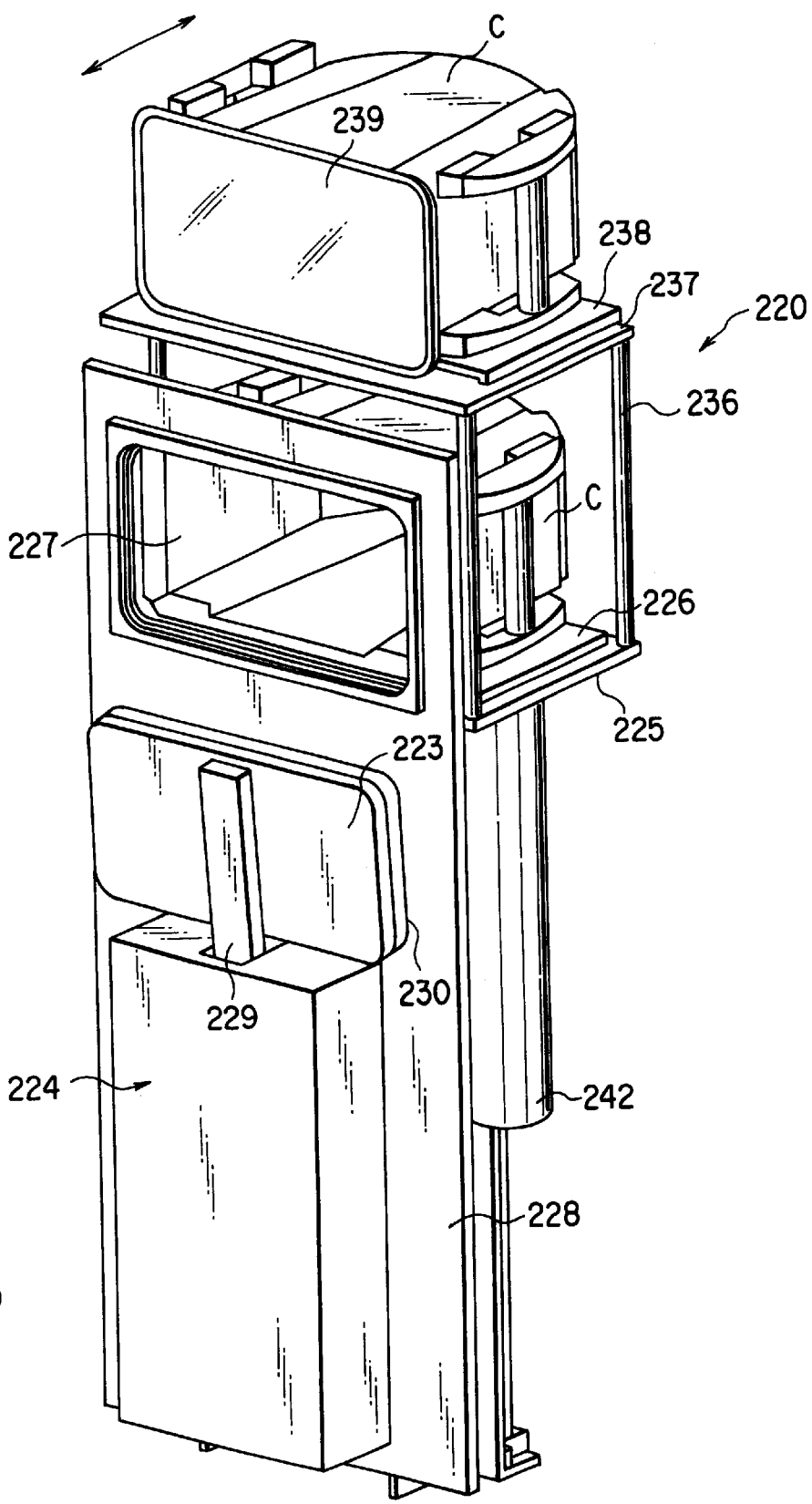
FIG. 5 is a perspective view showing an introduction stage according to an modification.
Figure 6:
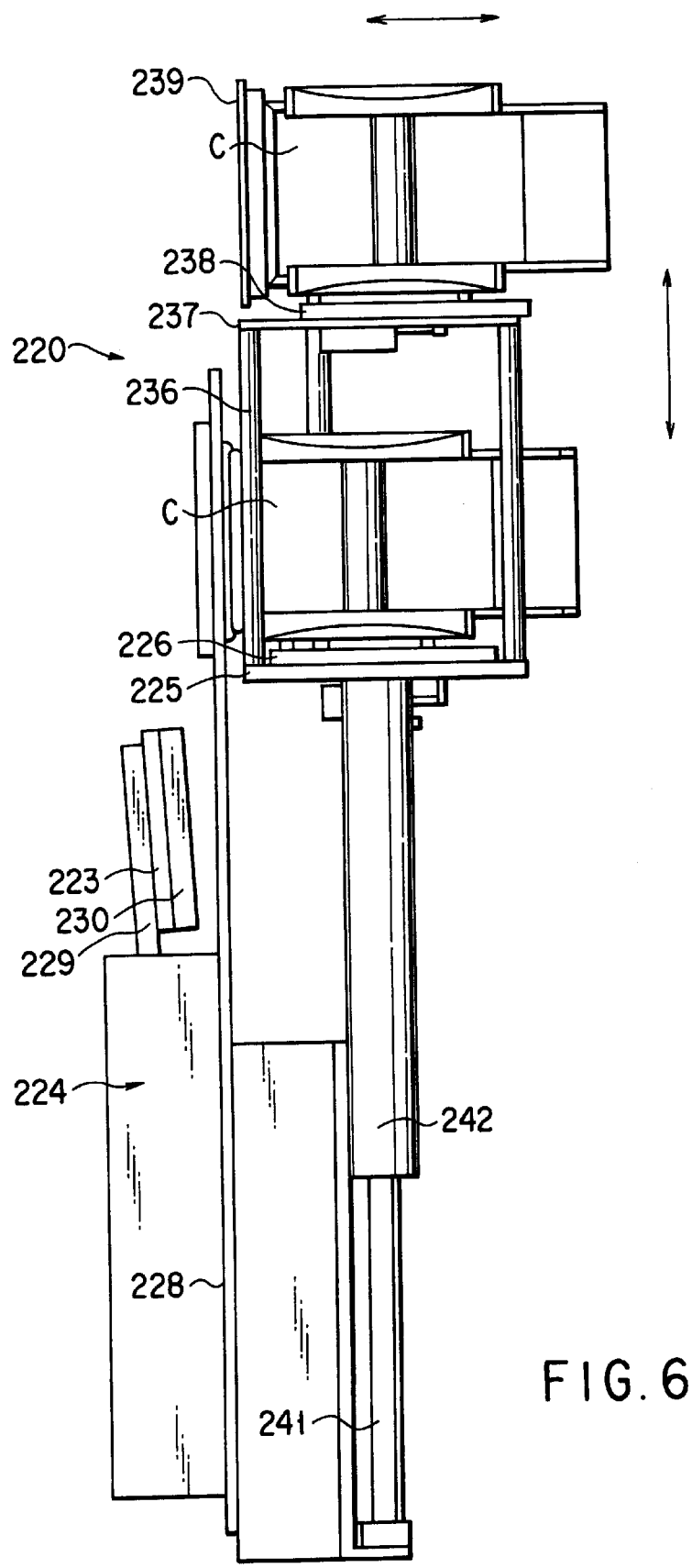
FIG. 6 is a perspective view of the introduction state shown in FIG. 5.

As indicated by the arrows in FIGS. 5 and 6, the table 226 is slid frontward in the horizontal direction until the lid 230 is fitted in the opening 227. The arm 229 is then swung to push the holder 223 against lid 230. After the lid 230 is unlocked, and the cassette C is removed from the lid 230. With these kept held, the table 226 is moved down. As a result, a wafer W can be taken out from the cassette C, loaded in the loading/unloading area 6, and conveyed to the measurement area 8.

Figure 7:
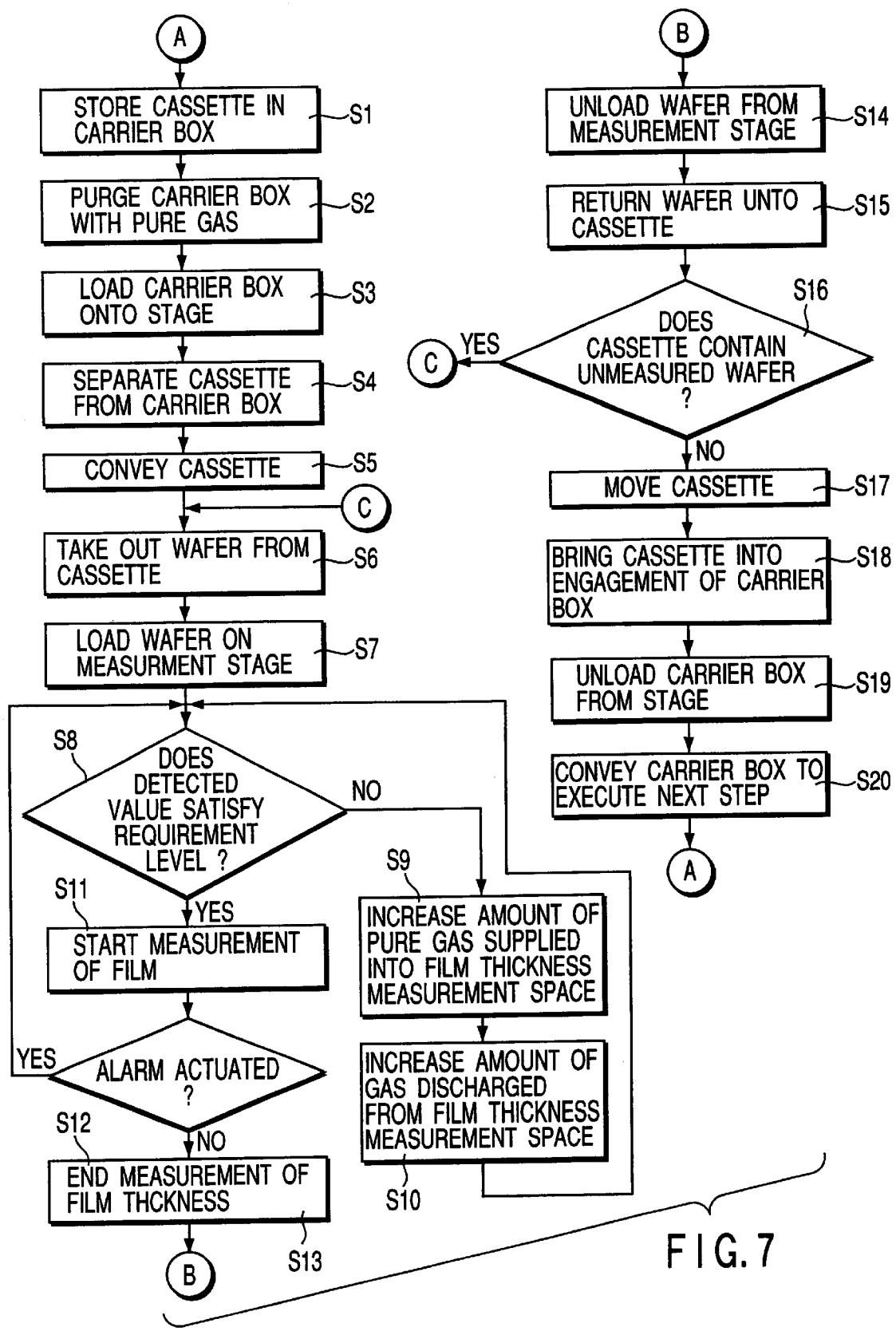
FIG. 7 is a flowchart according to which film measurement is performed by the apparatus shown in FIG. 1.

A description will be given with reference to FIG. 7 as to how the thickness of a thin film that is formed on a semiconductor wafer in a CVD furnace or a thermal oxidation furnace is measured by the apparatus described above.

A polysilicon film is formed, for example, on a silicon wafer W, by a CVD apparatus (not shown). A plurality of wafers (e.g., twenty-five wafers), each having a polysilicon film thereon, are housed in a cassette C. The wafers in this state are placed in the carrier box 12 (Step Sl). After the carrier box 12 is hermetically sealed by closing the lid, it is evacuated by the gas introducing/exhausting section 18. Subsequently, a pure gas is introduced into the carrier box 12 by the gas introducing/exhausting section 18, thereby filling the interior of the carrier box 12 with the pure gas (purge by the pure gas). The valve of the gas introducing/exhausting section 18 is closed so that the interior of the carrier box 12 is sealed (Step S2). The pure gas is substantially similar to the gaseous atmosphere in the film thickness measuring apparatus in light of their gaseous components thereof. That is, the gas contains few particles, and the amounts of impurities, such as moisture and hydrocarbon, are extremely small.

Either the conveyance robot or the operator places the sealed carrier box 12 on the predetermined portion on the introduction stage 10. The flange 14A of the container main body 14 is secured (loaded) to the stage 10 (Step S3). After a film is formed on wafer W, the wafer W is conveyed from the CVD apparatus to the film thickness measuring apparatus 2, preferably within 20 to 30 minutes.

After the flange 14A is secured to the stage, the vertically movable arm 34, located inside the cassette conveyance space 36, is moved up. The rotating pins 30 of the vertically movable table 28 are brought into engagement with the rotating ring mechanism 22. The lock pins 20 are drawn inside by rotating the mechanism. As a result, the container bottom 16 and the flange 14A are disengaged from each other, and the bottom 16 becomes separatable from the carrier box 12. That is, the cassette C mounted on the bottom 16 becomes separatable (Step S4). In this state, the table 25 is moved down to the lower position by the vertically movable arm 34, thereby allowing the cassette C to be received in the cassette conveyance space 36. The cassette insertion hole 26 is closed and shut off from the outside air by the container main body 14. Therefore, the cassette conveyance space 36 is shut off from the outside air.

Figure 4:
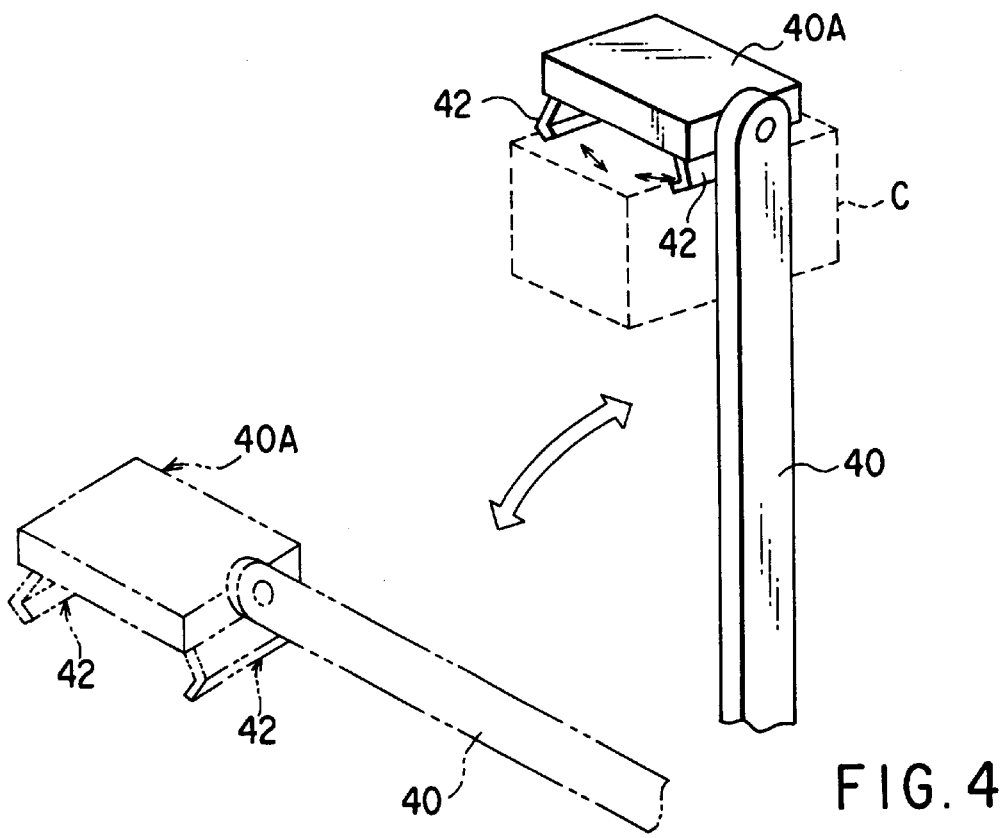
FIG. 4 is a perspective view showing part of a swing arm used for carrying a cassette.

As shown in FIG. 4, the cassette conveyance arm 40 is rotated to the vertical position, and the upper portion of the cassette C is clamped with the claws 42. In this state, the arm 40 is rotated to the declined position so that the cassette C, shown in FIG. 1, is moved onto the elevator table 44A, which is then at the lower limit position and is adjacent to the cassette. The cassette elevator 44 is moved up to move the elevator table 44A to the upper limit position. Accordingly, the cassette C can be carried into the wafer conveyance space 48 through the cassette passing hole 46 (Step S5). Subsequently, the conveyance arm mechanism 62 takes out one wafer W from the cassette C (Step S6), and the wafer W is placed (loaded) on the measurement stage 54 (Step S7). Prior to these steps, the upper fan 91 is driven to supply pure air into the housing, and pure gas is introduced into the housing through the introduction section 64A. The atmosphere inside the housing is discharged by way of the exhaust port 78 and the ducts 94, 95 and 96. As a result, the inside region of the housing is kept filled with pure gas, with a positive pressure state maintained. Fresh pure air is also supplied into the film thickness measurement space 50, which surrounds the measurement stage 54, from the filter section 90, and an appropriate amount of gas is discharged from the measurement space 50.

The purity of the gas discharged through the ducts (cover members) 94, 95 and 96 is detected by a detector (not shown), and a check is made to see if the detected value satisfies the requirement level (Step S8). If the determination result of Step S8 indicates "NO", the amount of pure gas supplied into the measurement space 50 is increased (Step S9), and the amount of gas discharged from the measurement space 50 is increased (Step S10).

Figure 9:
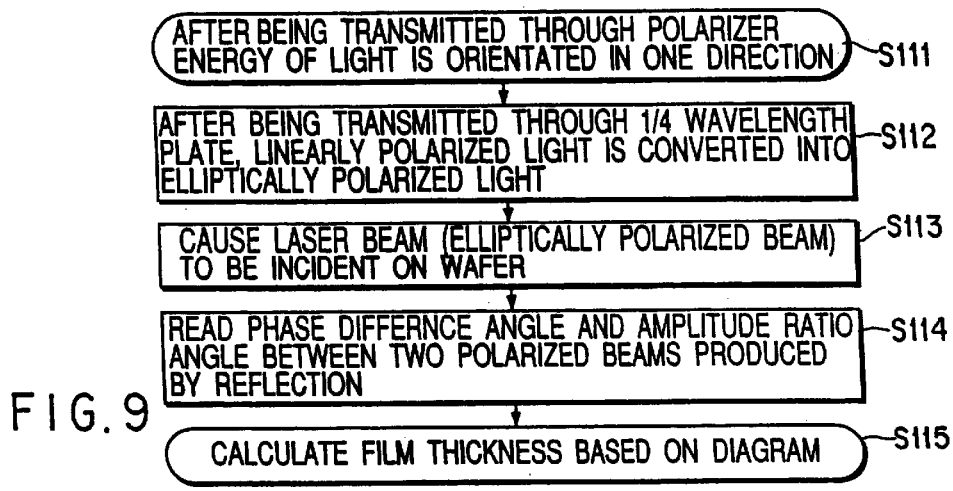
FIG. 9 is a flowchart showing the film measuring steps of the film thickness measuring mechanism depicted in FIG. 8.
Figure 10:
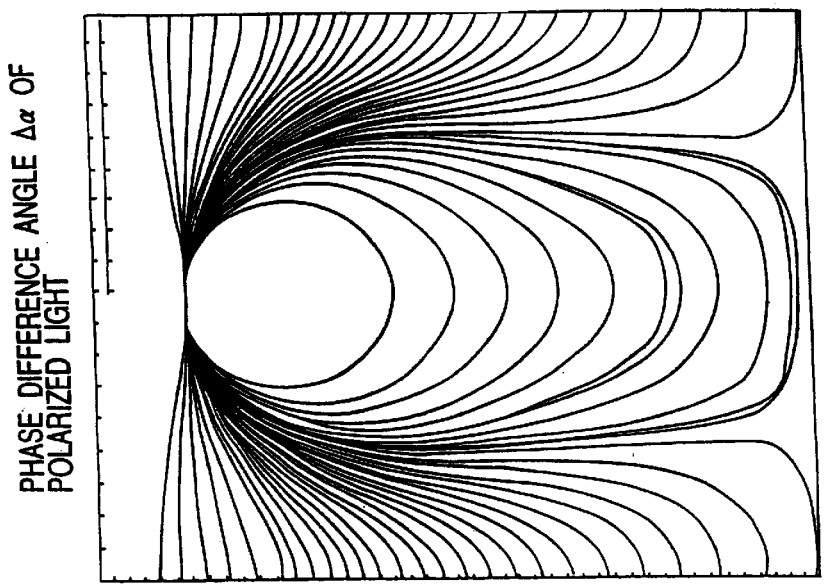
FIG. 10 is a graph which shows the characteristics of the polarized beam detected by the film thickness measuring mechanism shown in FIG. 8, and which is used for determining a film thickness.

When the determination result of step 58 indicates "YES", the power supply of the film thickness measuring apparatus is switched on, thereby permitting the light source 56 to emit light. Then, the detector 58 is set in a measurement-enabled state, and measurement of the film thickness is started (Step S11). As shown in FIG. 8, a helium-neon laser beam is having a single wavelength (623.8 nm) is emitted from the light source 56. The emitted laser beam is first linearly polarized by the polarizer 56a (Step S111), as shown in FIG. 9, and is then elliptically polarized by the ¼ wavelength plate 56b (Step S112). When this elliptically polarized light is incident on the surface of the wafer W at an angle α of incidence (Step 113), it is reflected at two locations, one is the surface of the thin film, and the other is the bottom face of the thin film. These two kinds of reflected light are made to pass through the analyzer 58a and detected by detector 58. The results of this detection are displayed on a monitor screen or the like. A reading mechanism 59, such as an operator or the CPU of the computer system, reads a phase difference $\Delta\alpha$ and an amplitude ratio angle $\Phi$ of me two kinds of reflected light from the detection data (Step 114), and a determining mechanism 60 calculates the film thickness on the basis of the read data and the diagram shown in FIG. 10 (Step 115).

When the light source 56 and the detector 58 are driven, a very small amount of gas is generated, and the ambient atmosphere is discharged by the exclusive-use ducts 95 and 96. If, during the measurement of the film thickness, the purity in the measurement space 50 is degraded for some reason or other, an alarm system (not shown) is actuated (Step S12). If a warning signal is issued by the alarm system (if the determination result in Step S12 indicates "YES"), the flow returns to step S8. If the determination result in Step S12 indicates "NO", a signal that indicates the end of film measurement is supplied to the power supply circuits, thereby ending the film thickness measurement (Step S13).

After the measurement of film thickness, the wafer W is unloaded from the measurement stage 54 by the conveyance arm mechanism 62 (Step S14), and is then returned into the cassette C placed on the elevator table 44A (Step S15).

Then, either the operator or the CPU of the computer system determines whether or not the cassette C contains an unmeasured wafer W (Step S16). If the determination result in Step S16 is "YES", the cassette C is moved up or down a little until the cassette C comes to the level where the conveyance arm mechanism 62 can take an unmeasured wafer W out of the cassette C. After the position of the cassette C is adjusted in this manner, the operations corresponding to Steps S6–S15 are repeated so as to measure the thickness of the thin film on the next wafer W.

If the determination result in Step S16 is "NO", this means that film thickness measurement has been completed with respect to all wafers W contained in the cassette C. In this case, the cassette C is moved from space 48 to space 36 (Step S17) and placed on the container bottom 16. The cassette C is raised together with the container bottom 16, until the container bottom 16 come into engagement with the carrier box 12 (Step S18). The carrier box 12 is then unloaded from the stage 10 (Step S19), and the cassette C is conveyed together with the carrier box 12 (Step S20) so as to execute the next step.

According to the apparatus described above, the interior of the apparatus is kept filled with pure air during the measurement of film thickness. Before being supplied into the apparatus, the pure air is made to pass through the chemical filter so that gaseous organic matter is captured and removed from the gas. Therefore, particles do not attach to the wafer surface, and foreign matter (e.g., moisture or hydrocarbon), which would result in fluctuations in the measurement of the film thickness, does not attach to the wafer surface, either. Accordingly, the film thickness can be measured accurately. To be more specific, the gas present in the ducts 94, 95 and 96 is discharged, and simultaneously highly-pure $N_2$ gas and $O_2$ gas are introduced into the interior of duct 94 and the spaces 36, 48 and 50. Owing to this feature, it is unlikely that moisture or other undesirable substances will attach to the wafer surface. Even if the wafer is left for a long time inside the film thickness measuring apparatus 2, this does not become a cause of variatis left for a long time inside the film thickness measuring apparatus 2, this does not become a cause of variations in the values of measured film thickness.

The internal pressures in the spaces 36, 48 and 50 are higher than the pressure of the outside air by several Torr, for example. With the internal pressures from enter the spaces by way of portions having poor comparatively large amount of moisture is prevented from enter the spaces by way of portions having poor seal characteristics. Accordingly, the moisture is reliably prevented from attaching to the wafer surface.

Even if pressure fluctuations are produced in the factory's exhaust system to which the exhaust passage 80 is connected, the automatic pressure adjusting valve 82 provided in the exhaust passage 80 enables the internal pressures in the spaces 36, 48 and 50 to be kept positive at all times. Accordingly, external air is reliably prevented from entering the apparatus.

The gas flow rates of the gas introduction sections 64A, 64B and 64C are determined in accordance with the volumes of the spaces of the apparatus, the number of gas introductions provided, etc. Broadly speaking, the maximum gas flow rate of one introduction section is 50 liters per minute or so.

Since the pure gas introduced into the apparatus is very dry, it is likely that the gas will be charged electrostatically, causing various adverse effects to the film pressure measurement. This problem is solved by providing ionizers 75 in the gas introduction sections 64A, 64B and 64C. The ionizers 75 serve to neutralize the gas, thereby removing the static electricity from the gas.

The sealed carrier box 12 is provided with the gas introducing section 18. If the pure gas is introduced through this gas introducing section 18 as well, moisture or other undesirable substances are very reliably prevented from attaching to the wafer.

Enclosed by the outer cases 38 and 52, the spaces 36, 48 and 50 are provided with a very high degree of sealing property. In addition, the internal pressure in the spaces is controlled to be positive, as described above. Owing to this feature, the outside air does not flow into the interior of the apparatus even if the degree of sealing property is not very high. Accordingly, the original purpose of preventing attachment of moisture or the like can be attained.

In the above embodiment, a mixture gas made up of industrially pure $N_2$ and $O_2$ gases and containing an extremely small amount of impurities (e.g., moisture) is used as a substitutive gas. In place of that mixture gas, $N_2$ gas may be used singly. Moreover, the other kinds of insert gas, such as Ar gas and He gas, may be used singly or in a mixed state of two or more kinds.

Figure 11:
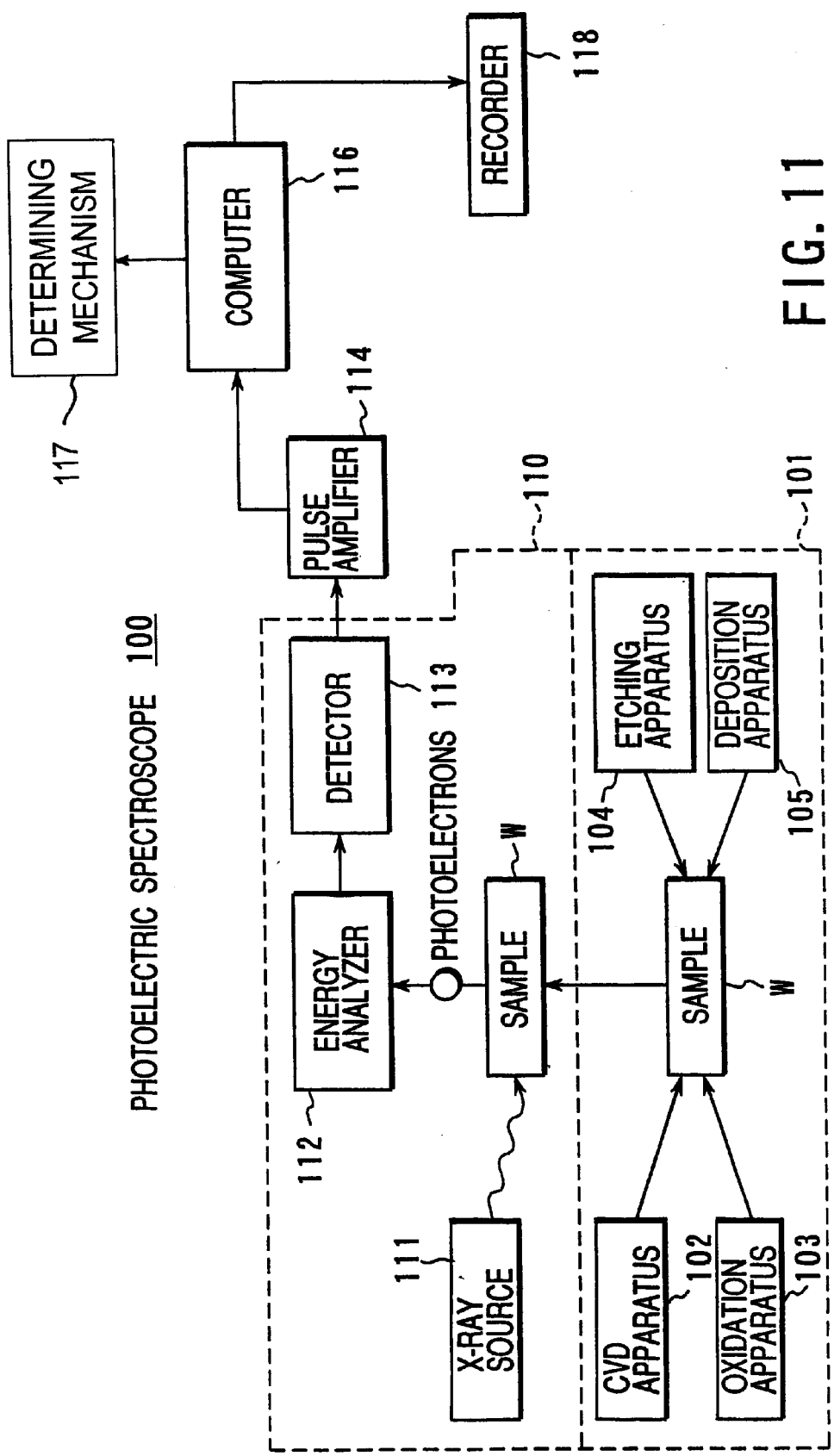
FIG. 11 is a view showing a film thickness measuring mechanism employed according to a modification and schematically illustrating how the film thickness measuring mechanism utilizes X-ray photoelectric spectroscopy.

A film thickness measuring means which is according to another embodiment and which employs an X-ray photoelectric spectroscope will be described with reference to FIG. 11.

The X-ray photoelectric spectroscope 100 comprises an X-ray source 111, an energy analyzer 112, a detector 113, a pulse amplifier 114, a computer 116 and a recorder 118. The measurement chamber 110 of the X-ray photoelectric spectroscope 100 is adjacent to a sample processing chamber 101. From the sample processing chamber 101, a processed sample W is conveyed to the measurement chamber 110 by a conveyance apparatus (not shown) without being exposed to the outside atmosphere.

Various processing apparatuses are arranged in the sample processing chamber 101. For example, the following processing apparatuses are provided: a CVD apparatus 102 for forming a film by causing a process gas to react with the surface of the sample W; a thermal oxidation apparatus 103 for forming a thermal oxidation film on the surface of the sample W by heating the sample in the oxidation atmosphere; an etching apparatus 104 for etching the surface of the sample; a deposition apparatus 105 for forming a deposition film by causing a metal vapor to react with the surface of the sample; etc.

According to the present technology, the sample W is processed to have a film thereon in the sample processing chamber 101, and after execution of at least this film formation processing, the sample W is conveyed into the measurement chamber 110. In the measurement chamber, the sample W is placed on a mount table, and is irradiated with X-rays emitted from an X-ray source 111 and having a predetermined wavelength. When the X-rays are incident on the thin film, a large number of photoelectrons, which are at various energy levels reflecting element-bond states, are emitted from the thin film. The photoelectrons are captured by the energy analyzer 112, and are then counted by the detector 113 with respect to each energy level. Each of the resultant count signals is amplified by the pulse amplifier 114 and supplied to the computer 116.

By using the computer 116, the operator calculates a target energy rate, and data on the calculated result is output by the recorder 118. On the basis of the output data and a predetermined diagram, a determining mechanism 117, such as the operator, determines the film thickness.

Figure 12:
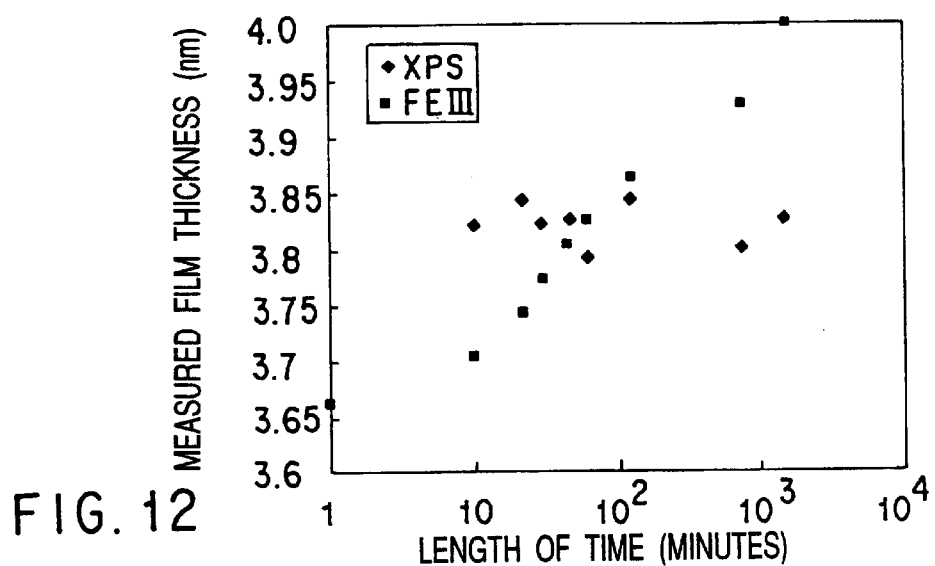
FIG. 12 is a characteristic graph showing the relationships between the measured thickness and the time elapses from the time of film formation.

FIG. 12 is a characteristic graph, wherein the length of time (minutes) for which a film is left to stand after film formation is plotted on an abscissa, and the measured film thickness (nm) is plotted on an ordinate. The characteristics graph shows how the length of time for which the film is left to stand has effects on the measured film thickness in each of the measurement methods. In FIG. 12, black diamond plots represent results obtained by an X-ray photoelectron spectrum-based type film thickness measuring apparatus (XPS), and black rectangular plots represent results obtained by a conventional elliptical polarization-based film thickness measuring apparatus (FEIII).

Figure 13:
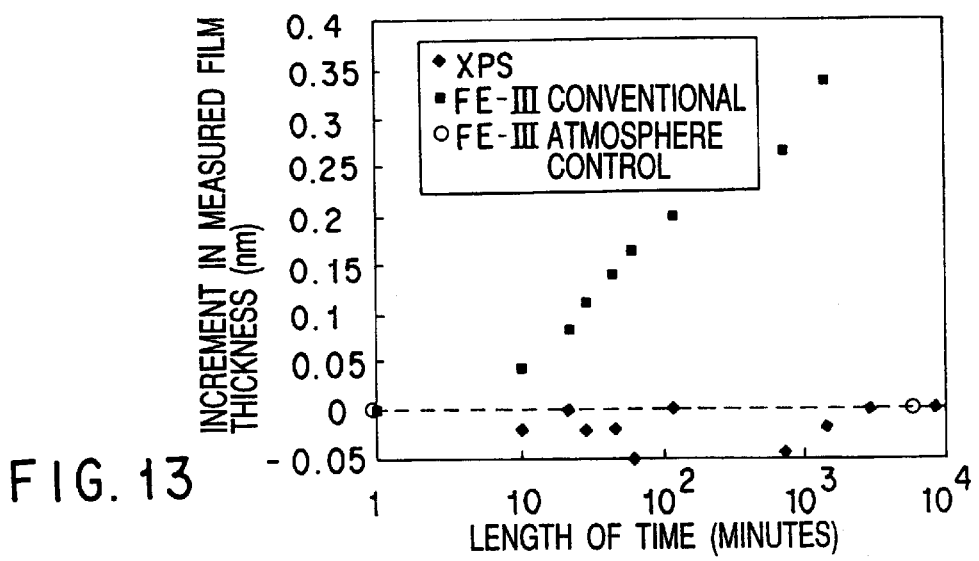
FIG. 13 is a characteristic graph showing the relationships between an increase in the measured thickness and the elapsed time.
Figure 17:
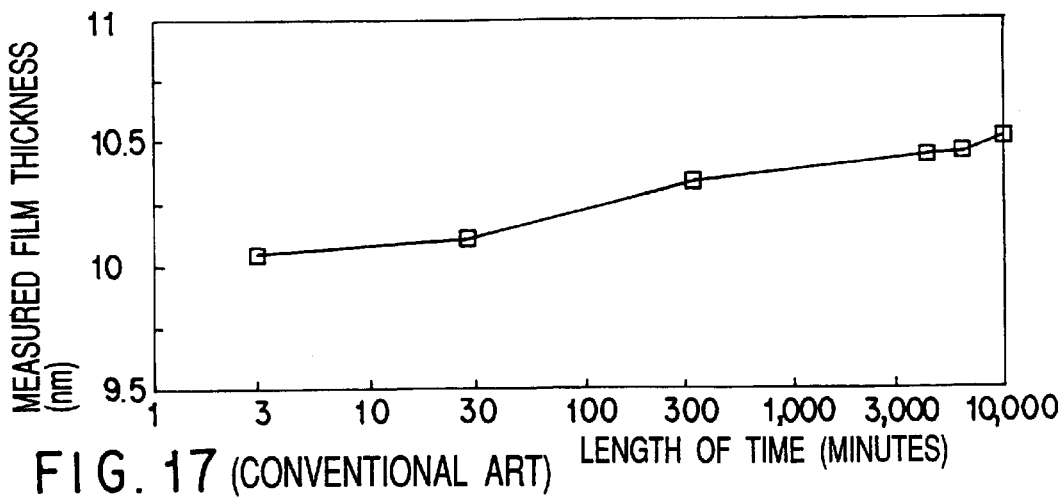
FIG. 17 is a characteristic graph showing how the film thickness measured by the conventional apparatus varies depending upon the time.

FIG. 13 is a characteristic graph, wherein the length of time (minutes) for which a film is left to stand after film formation is plotted on an abscissa, and an increment (nm) with which the measurement of the film thickness increases is plotted on an ordinate. The characteristics graph shows how the length of time for which the film is left to stand has effects on the increment with which the measurement of the film thickness increases. In FIG. 13, black diamond plots represent results obtained by the X-ray photoelectron spectrum-based type film thickness measuring apparatus filled with pure air which is introduced from the obtained by the conventional elliptical polarization-based film thickness measuring apparatus (FEIII), and white circular plots represent results obtained by the elliptical polarization-based film thickness measuring apparatus (FEIII) of the present invention. As apparent from FIG. 13, the film thickness values measured by the conventional apparatus vary greatly, while the film thickness values measured by the apparatus of the present invention do not vary greatly and are stable.

As described above, the film thickness measuring apparatus of the above structure is advantageous in the following points:

A substrate can be conveyed from the introduction stage to the measurement stage by way of spaces which are shut off from the outside air and the atmospheres in which are controlled. Hence, the variation in the film thickness measurement values measured in the measurement stage is suppressed. More specifically, the conveyance space and the measurement space are filled with pure air which is introduced from the filter means (filter units) located above and which is cleared of a gaseous organic substance or other undesirable substances. Since, therefore, organic substances do not attach to the surface of the substrate, the variation in the film thickness measurement values is suppressed without reference to the length of time for which the film is left to stand after film formation. Accordingly, the film thickness can be measured with high accuracy. It should be noted that film, the variation which the measurement space. The filter means may be arranged on one side of the measurement space. In this case, it is preferable that the measurement stage be located outside of ducts, so that the measurement stage may not be surrounded by the ducts.

The first exhaust means locally discharges the ambient atmosphere of the film thickness measuring means. Owing to this, the adsorption preventing effect for organic substances can be improved. In addition, the second exhaust means locally discharges the ambient atmosphere of the measurement stage. Owing to this, the adsorption preventing effect for organic substance can be further improved. In the case where an elliptical polarization analyzing apparatus (ellipsometer) is employed, the first exhaust means locally discharges the gas generated by the light source and detector. As a result, the ambient atmosphere of the substrate placed on the measurement stage can be purified further, the variation which the film thickness measurement values may undergo with time can be reduced.

In the region above the measurement stage, a pure gas is supplied into the ambient atmosphere of the substrate, while simultaneously discharging part of the ambient atmosphere. Owing to this, even if the thickness of a thin film is measured after the elapse of a long time from the formation of that film, the variation which the film thickness measurement values may undergo with time can be reduced.

As described above, the present apparatus prevents the film thickness measurement value from varying depending upon the time before measurement, and therefore enables accurate evaluation of the film thickness. In addition, time management need not be performed with respect to a substrate after a film is formed thereon.

A processing apparatus according to another embodiment of the present invention will be described with reference to FIGS. 14 and 15.

The major section of the processing apparatus is made up of: a process tube 301 serving as a processing chamber in which predetermined processing is executed with respect to a wafer W, i.e., an object to be processed; a sealed-structure conveyance chamber 310 provided with an elevating mechanism 311 for inserting a wafer boat 307, serving as a holding member in which a large number of wafers W (e.g., 100 wafers) can be stored, into the process tube 301 or for removing the wafer boat 307 from the process tube 301, and a conveyance mechanism 315 described below; a wafer carrying chamber 330 in which the wafers W stored in a wafer carrier C are conveyed toward the conveyance chamber 310; and a wafer boat storage chamber (a holding member storage chamber) having such a minimum volume as enables storage of the wafer boat 307 only and constituting a load lock chamber.

A front auto door 321, which can be opened or closed, is located between the wafer boat storage chamber 320 and the wafer conveyance chamber 330. Likewise, a rear auto door 322, which can be opened or closed, is located between the wafer boat storage chamber 320 and the conveyance chamber 310. When both the front auto door 321 and the rear auto door 322 are closed, the wafer boat storage chamber 320 can be kept in the sealed state. To the wafer boat storage chamber 320, the following are coupled: a vacuum tube 323 which is connected to a vacuum pump 352 with an opening/closing valve 354 inserted therebetween; an $N_2$ gas introduction tube 324 which is connected to an $N_2$ gas supply section 344 with an opening/closing valve 346 inserted therebetween; and an $N_2$ gas discharge tube 358 which is connected to a suction pump 325 with an opening/closing valve 356 inserted therebetween. By use of these tubes 323, 324 and 325, the internal gas of the wafer boat storage chamber 320 can be replaced with a predetermined vacuum atmosphere or an insert gas atmosphere, such as an $N_2$ gas atmosphere. The driving of the pumps 352 and 358 and the gas supply section 344, and the opening/closing operation of the opening/closing valves 346, 354 and 356 are controlled by a driving control section (not shown).

The wafer boat storage chamber 320 is provided with a means (not shown), arranged in the interior thereof, for sensing whether or not the wafer boat 307 has been set.

The process tube 301 is formed of quartz and is provided as a vertical type cylindrical container having an inverted-"U" shape cross section. A heater 305 is provided on the outer wall of the process tube 301 in such a manner as to surround the process tube 301. The process tube 301 and the heater 305 are enclosed with a protective cover 306 in which a cooling tube, a heat insulator, etc. are built in. A manifold 302 is coupled to the lower-end opening of the process tube 301. The manifold 302 is cylindrical and has flanges at the upper and lower ends. Connected to the circumference of the manifold 302 are: a gas introduction tube 304 for introducing a predetermined process gas into the process tube 301, and a discharge tube 303 for discharging the gas remaining after the processing, from the process tube 301. The gas introduction tube 304 is connected to both an $N_2$ gas supply section and a process gas supply section through a gas switching valve (not shown), so that either the process gas or the $N_2$ gas is selectively introduced into the process tube 301. The gas introduction tube 304 is provided with a mass controller at position downstream of the gas switching valve. With this mass controller, the amount of treatment gas or $N_2$ gas supplied into the process tube 301 can be controlled in an optimal manner. The discharge tube 303 is connected to a vacuum pump 349 through an opening/closing valve 350.

The conveyance chamber 310 is of a hermetically sealed structure. This sealed structure is realized by welding a stainless steel panel or employing an O-ring seal. To proper positions in the upper and lower regions of the conveyance chamber 310, an $N_2$ gas supply tube 312 and an $N_2$ gas discharge tube 313 are coupled, respectively. The $N_2$ gas supply tube 312 is connected to the $N_2$ gas supply section 344 through an opening/closing valve 348, and the $N_2$ gas discharge tube 313 is connected to a suction pump through an opening/closing valve. A pure inert gas (N₂ gas), which serves as a purge gas, is introduced through a gas introduction tube 312 into the conveyance chamber 310 at all times. Simultaneous with this, the inert gas inside the conveyance chamber 310 is discharged through the discharge tube 313 together with the impurities at all times. In this manner, the inert gas atmosphere inside the conveyance chamber 310 is kept positive and highly pure.

The elevating mechanism 311 inside the conveyance chamber 310 is made up of: a boat elevator 311a provided with a heat-retentive cylinder 351 for holding a wafer boat 307 placed thereon while keeping it warm; and a ball screw apparatus 311b for vertically moving the boat elevator 311a.

Inside the conveyance chamber 310, a conveyance mechanism 315 is arranged at a position close to the wafer boat storage chamber. The conveyance mechanism 315 conveys the wafer boat 307 between the boat elevator 311a of the elevating mechanism 311 and the wafer boat storage chamber 320. The conveyance mechanism 315 comprises: a driving section 315a located outside the conveyance chamber 310 and enabling horizontal rotation (revolution) and vertical motion; and a multi-joint arm 315b located inside the conveyance chamber 310, connected to the transmission shaft of the driving section 315a, and being capable of holding the wafer boat 307. The opening of the process tube 301 is located in the upper region of the conveyance chamber 310. An auto shutter 308 is provided for the opening of the process tube 301 to close or open the opening. When the auto shutter 308 closes the opening, radiant heat is prevented from being transmitted from the process tube 301 to the conveyance chamber 310.

The wafer conveyance chamber 330 is arranged inside a clean room (not shown). An I/O port 331 is provided in the wafer conveyance chamber 330, and a wafer carrier C, capable of storing a plurality of wafers W (e.g., twenty-five wafers), is mounted on the I/O port 331. The I/O port 331 is provided with two posture-changing mechanisms on the right and left sides, respectively. By the posture-changing mechanisms 340, the wafer carrier C is switched from the upright state to the horizontal state. At the upright state, the wafer carrier C mounted on the upper surface of the upper faces of the posture-changing mechanisms 340 is made to stand (which is a state where the wafers W are held to expand in the vertical direction and which is indicated by the solid-lines in FIG. 14). At the horizontal state, the wafer carrier C is laid (which is indicated by the one-dot-dash lines in FIG. 14). The wafer carrier C is switchable in the reverse direction, i.e., from the horizontal state to the upright state.

In the wafer conveyance chamber 330, a carrier transfer 332 is arranged right behind the I/O port 331. The carrier transfer 332 is vertically movable by means of an elevator 333. A transfer stage 334 is arranged behind the carrier transfer 332, and a carrier stock stage 335 is arranged above the transfer stage 334. The carrier transfer 332 is vertically movable in accordance with the vertical movement of an elevating unit 342, as indicated by the arrow. The wafer carrier C set in the horizontal state by the posture-changing mechanisms 340 is taken hold of by the multi-joint arm and is placed on the carrier transfer 332. Upon receipt of it, the carrier transfer 332 moves it to the carrier stock stage 335. The carrier stock stage 335 is like shelves having two columns and four rows, where wafer carriers C conveyed by the carrier transfer 332 are stored. The carrier transfer 332 has an opening formed in the rear portion thereof, and air cleaned by the fan filter unit 90 (to be described later) is supplied into the carrier transfer through the opening. A wafer transfer 336 is arranged in the wafer conveyance chamber 330 at a position close to the wafer boat storage chamber, and the wafer transfer 336 is vertically movable by means of a transfer elevator 337. The wafer transfer 336 takes the wafers W out of the wafer carrier C on the transfer stage 334 one by one, while moving in the vertical direction, and causes the wafers to be stored and held in the wafer boat 307 arranged in the wafer boat storage chamber 320. Conversely, the wafer transfer 336 takes a wafer W out of the wafer boat 307 and returns it into the wafer carrier C of the transfer stage 334. The conveyance apparatuses 311, 315, 331, 333, 336 and 340 described above are driven and controlled by driving sections (not shown). The operation and detailed structure of them are disclosed in U.S. Pat. No. 5,462,397 which is incorporated herein as a reference.

Figure 14:
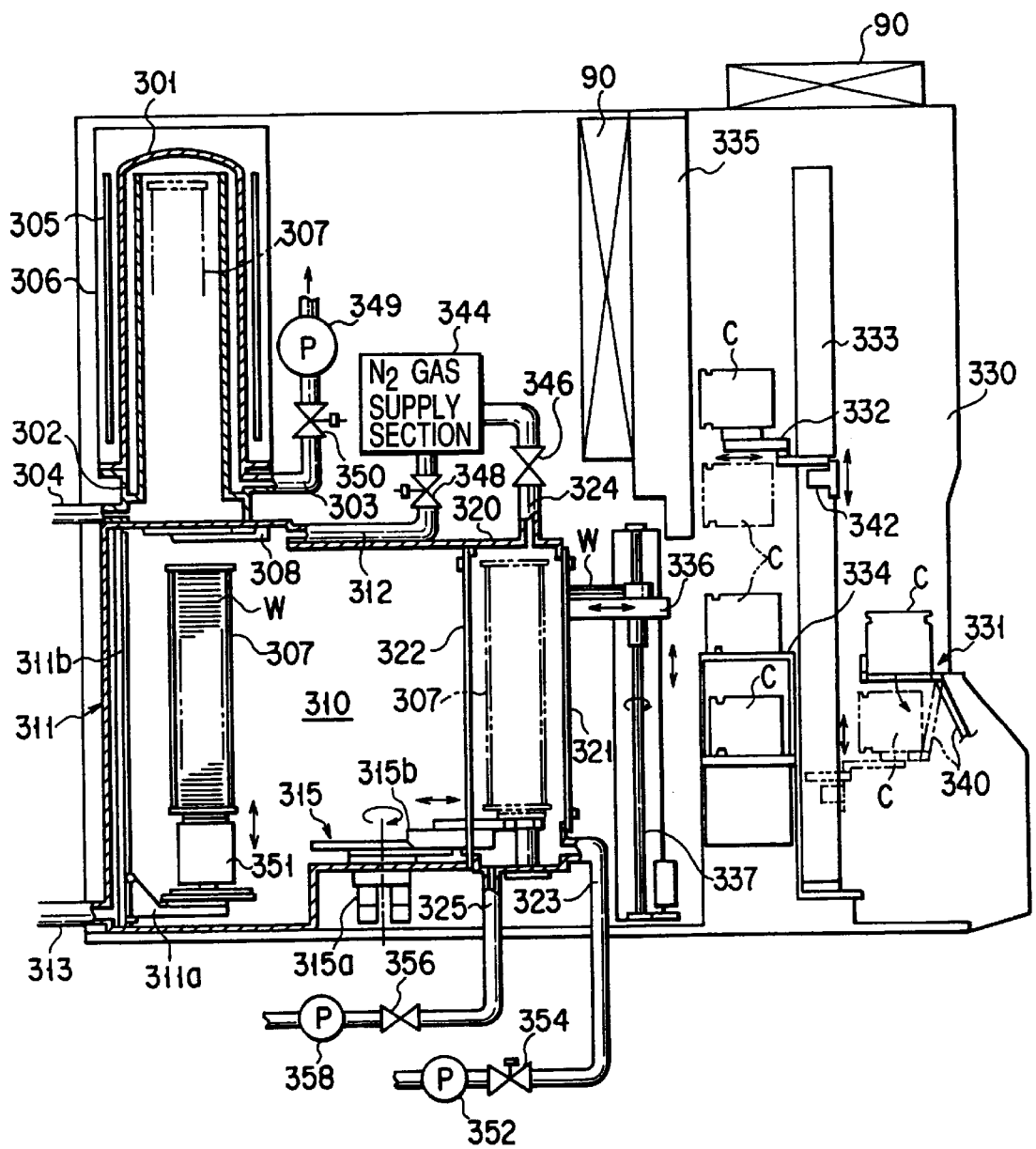
FIG. 14 is a schematic illustration showing a substrate processing apparatus according to another embodiment of the present invention.

As shown in FIG. 14, the present apparatus is provided with fan filter units 90, serving as filter means. One fan filter unit is provided for the upper wall of the housing and corresponds in position to the wafer conveyance chamber 330. Another fan filter unit is located behind the carrier stock stage 335. As in the embodiment described above, each of those units is an integral combination of a fan, a chemical filter, and a ULPA filter, which are laminated in the order mentioned. Air is supplied into the wafer conveyance chamber 330, after organic substances are removed by the chemical filter and particles are captured and removed by the ULPA filter. In this manner, the wafers in the cassette C are prevented from being contaminated, and where a thin film is formed on the wafer, organic substances are prevented from attaching to the thin film.

As shown in FIG. 15, in the processing apparatus, a measurement box 389 in which a film thickness measuring mechanism 390 is arranged is juxtaposed to the wafer conveyance chamber 330. The box 389 and the wafer conveyance chamber may be communicate with each other. Alternatively, they may be connected together by means of an openable/closable gate. A wafer conveyance mechanism 391 is arranged in the measurement box so as to permit a wafer to be conveyed between the film thickness measuring mechanism 390 and the wafer conveyance chamber. Since the wafer conveyance mechanism may be substantially similar to that shown in FIG. 1, a detailed description of it will be omitted. As the film thickness measuring mechanism 390, the mechanism shown in FIG. 8 (which utilizes an elliptical polarization method) or the mechanism shown in FIG. 11 (which utilizes an X-ray photoelectron spectral method). In the measurement mechanism, it is preferable that the stage on which a wafer is placed for film thickness measurement be substantially at the same level as the wafer transfer 336 located at the lower limit position, since this structure enables easy conveyance between the stage and the wafer transfer.

In the measurement box 389, the fan filter unit 90 is provided so as to supply the purified air described above into the box, especially to the wafer placed on the stage. In the embodiment, the unit 90 is located on one side of the box 389 and is illustrated as such. Needless to say, however, the unit 90 may be arranged above the box, as in the embodiment shown in FIG. 1. The box 389 is provided with an exhaust tube 393, which is connected to a vacuum pump 392. By this structure, the interior of the box 389 is controlled to be in the predetermined state, preferably a positive pressure state. As in the foregoing embodiment, it is preferable that the unit 90 be located inside a clean room.

In FIG. 15, reference numeral 398 denotes a determination device for determining whether or not the film thickness measured by the film thickness measuring mechanism is a desired value (i.e., within a predetermined range). An alarm device 399 and a control section 400 are connected to the output of the determination device 398. The alarm device 399 is provided for the present processing apparatus so as to warn the operator by sound and/or display that the measurement result does not show the desired film thickness. The control section 400 controls the processing data to be used when a wafer is processed in the process tube 301. Also, the control section 400 can control the processing data to be used in another processing device 401, i.e., the processing device that executes the next step. In the former case, a thin film may be formed on a dummy wafer in the process tube 301. The thin film on the dummy wafer is measured by a measuring mechanism, to check whether or not the measurement value is a desirable value. If the measurement value is desirable, the same processing conditions are used in the next thin film formation process. If the film is too thick, a shorter processing time is set, and/or a low-temperature condition is set. If the film is too thin, the reverse settings are determined. Based on this processing, a film having a desirable thickness can be formed. It can be understood that the dummy wafer can be used for one cassette or for a number of cassettes. In the latter case, data on the measured film thickness is used for controlling the device which executes the next step. For example, the data is used for controlling the processing data of a heating device. In this manner, the process of the next step can be controlled in accordance with the film thickness.

Figure 16:
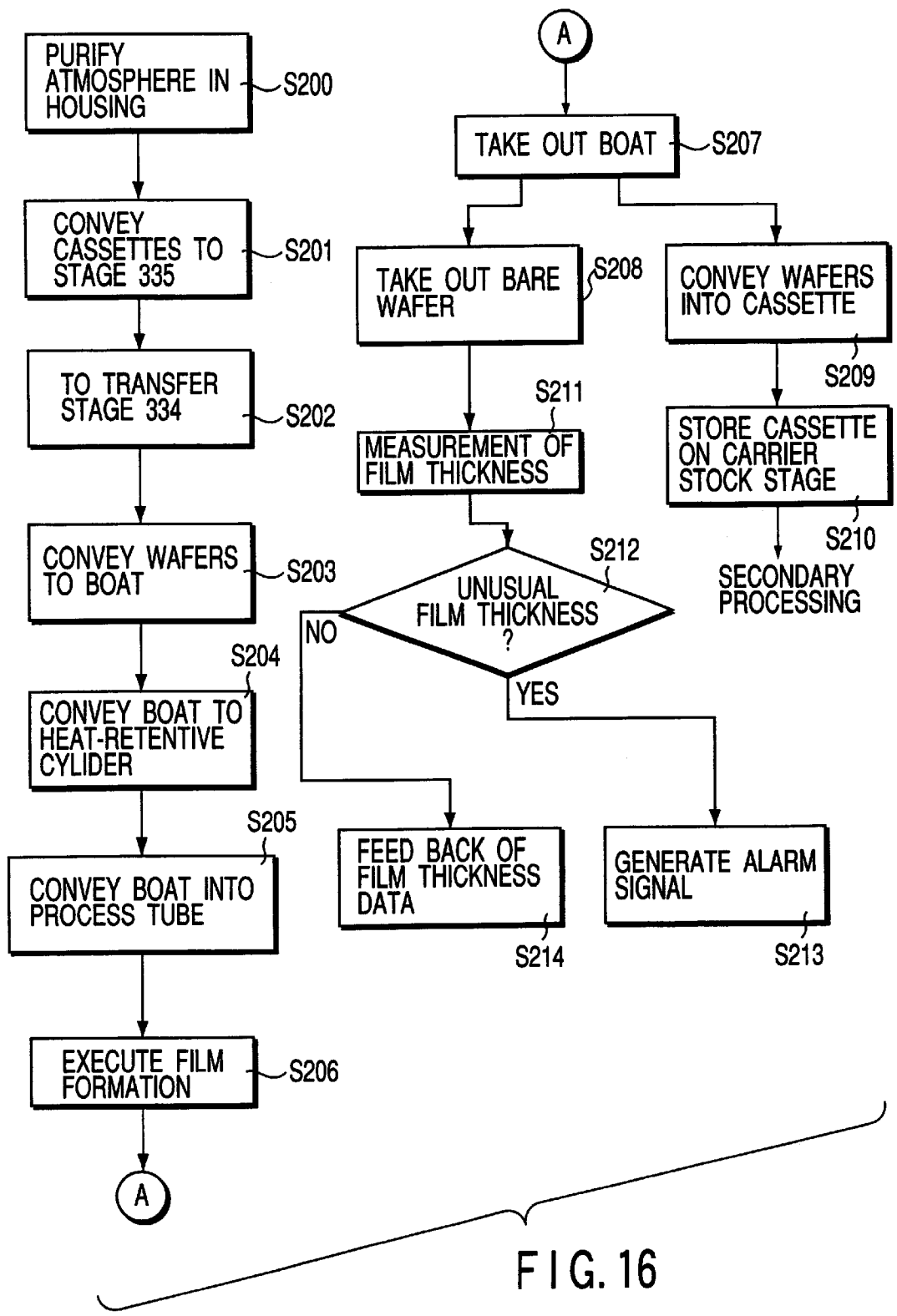
FIG. 16 is a flowchart showing one method in which the processing apparatus depicted in FIG. 14 executes film formation.

An apparatus having the above structure can be configured as a thin film forming apparatus, and a method in which a thin film is formed on a semiconductor wafer by that thin film forming apparatus will be described with reference to FIG. 16.

As indicated as Step S200, the atmosphere in the entire apparatus, including the measurement box 389, is purified by the filter units 90 and another inert gas introducing/discharging mechanism. In this state, a cassette C, in which wafers are contained, is conveyed from the outside (clean room) of the apparatus and placed on the I/O port 331 inside the apparatus. After the posture is controlled, the cassette C is supplied to the carrier transfer 332, and is then conveyed to the carrier stock stage 335 by the transfer. With these operations repeated, a plurality of cassettes C, the number of which corresponds to the number required to execute a batch processing, are temporarily collected on the carrier stock stage 335 (Step S201). During conveyance of these required-numbered cassettes C or after that conveyance, the cassettes C on the stock stage 335 are conveyed to the transfer stage 334 (Step S202). The front auto door 321 is opened, and the wafers in the carrier C placed on the transfer stage 334 are sequentially conveyed to the wafer boat 307 inside the boat storage chamber 320 by the wafer transfer 336 (Step S203). After a predetermined number of wafers are stored in the wafer boat 307, the front auto door 321 is closed, and the interior of the wafer boat storage chamber 320 is kept in the sealed state. In this state, the atmosphere in the conveyance chamber 310 is controlled, and then the rear auto door 322 is opened. Thereafter, the conveyance mechanism 315 is driven, by which the wafer boat 307 in the wafer boat storage chamber 320 is conveyed onto the heat-retentive cylinder 351 arranged on the boat elevator 311a (Step S204). Subsequently, the wafer boat 307 is set on the boat elevator 311a. In response to this, the boat elevator 311a moves up, and the wafer boat 307 is conveyed into the process tube 301 (Step S205). At the time, the flange at the lower end of the wafer boat 307 comes into contact with the flange at the lower end of the manifold 302, thereby sealing the process tube 301. In this state, the $N_2$ gas is discharged from the process tube 301 through an exhaust tube 3, and the interior of the process tube 301 is set in a vacuum state. Then, a processing gas is introduced into the process tube 301 through the gas introduction tube 304, and a desired film forming processing is executed with respect to the wafer W (Step S206).

The gas pressure in the process tube 301 is adjusted so that it becomes equal to the gas pressure in the conveyance chamber 310. Thereafter, the wafer boat 307 is moved down by means of the elevating mechanism 311. The wafer boat 307 is conveyed from the process tube 301 into the conveyance chamber 310, and further from the conveyance chamber into the boat storage chamber 320 (Step S207). By the wafer transfer 336, wafers are taken out of the wafer boat 307 and moved out from the boat storage chamber. Of the wafers thus taken out, a bare wafer (a dummy wafer) is conveyed further to the film thickness measuring mechanism 390 by the conveyance mechanism 391 (Step S208). The other wafers are conveyed by the conveyance wafer transfer 336 and are sequentially inserted into the cassette (Step S209), which is then located at the lower limit position. When a predetermined number of wafers have been inserted into the cassette, the carrier transfer 332 is driven and moved to the upper position. At this upper position, the cassette C is conveyed from the carrier transfer 3332 to the carrier stock stage 335 by the multi-joint arm, and is held on the carrier stock stage 335 (Step S210). With these operations repeated, a predetermined number of cassettes C are stored in the carrier stock stage 335 in a stand-by state.

The thickness of the dummy wafer conveyed to the film thickness measuring mechanism 390 is measured by the measuring mechanism (Step S211). Subsequently, the determination device 398 determines whether or not the measured thickness of the dummy wafer is a predetermined one (within a predetermined range) (Step S212). If the measured thickness is not a predetermined one, the alarm device 399 warns the operator that the film formed on the wafer does not have a desired thickness. Hence, the operator understands that the wafers in the cassette C held on the carrier stock stage 335 in a stand-by state are not suitable to execution of the next step. The operator therefore decides not to execute the normal processes with respect to these wafers, and unloads the cassette from the present processing apparatus so as to execute secondary processing, such as the processing of washing off the film formed for reuse. The wafers having defective films need not be removed manually by the operator. They may be automatically conveyed to the secondary-processing site in response to the determination that the film thickness of the dummy wafer is inappropriate.

When the film thickness of the dummy wafer measured by the film thickness measuring mechanism 390 is a predetermined one (within the predetermined range), data on the film thickness is stored, and is further supplied to the control section 400 (Step S214). By this control section, the processing conditions of the film formation processing (Step S206) and the processing conditions for the second processing device 401 are varied, if required. Simultaneous with this, the cassette is conveyed from the carrier stock stage 335 to the outside of the processing apparatus, so as to execute the next step by another processing apparatus. It is preferable that the present processing apparatus be connected to the second processing apparatus in such a manner that a cassette can be conveyed without being exposed to the atmosphere.

Alternatively, the processing apparatus by which the next step is executed may be adjacent to the film thickness measuring box 38. In this case, a wafer can be processed immediately after the measurement of a film thickness, with no need to store it in the cassette.

In the foregoing description, reference was made to the case where the processing apparatus shown in FIG. 14 was used as a film formation apparatus. However, the processing apparatus can be used as an apparatus which first measures a film thickness and then executes another kind of processing whose parameters can be adjusted or controlled on the basis of the results of the film thickness measurement, such as heat treatment, the formation of another film, diffusion processing, or the like. In this case, wafers C taken out from the cassette C are not conveyed directly to the boat; they are conveyed first to the film thickness measuring mechanism, for the measurement of a film thickness, and then to the boat.

In this processing apparatus and the processing method, it is possible to attain the same advantages as those of the embodiment described above.

When the above embodiment was described, reference was made to the case where the thickness of a thermally oxidation film was measured. Needless to say, the present invention can be applied to the measurement of a CVD film. In addition, the object to be measured is not limited to a semiconductor wafer; it may be a glass substrate, an LCD substrate, etc. The substrate to be processed may be an untreated substrate on which no thin film is formed, or a treated substrate on which a thin film is formed.

According to the present invention, a film formed on a substrate can be measured with high accuracy. If necessary, the processing conditions under which the substrate is processed before and after the measurement can be controlled on the basis of the results of measurement. Accordingly, the present invention is applicable to devices of various kinds, such as a semiconductor device and a liquid crystal device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A film thickness measuring apparatus comprising:
   a housing which substantially shuts off an internal region thereof from outside air;
   an introduction stage on which a cassette is mounted, the cassette containing a plurality of substrates which have thin films formed thereon;
   a measurement stage which is arranged inside the housing and on which the substrate is placed for measuring the thickness of the thin film;
   a conveyance mechanism, arranged inside the housing, for moving the substrates between the inside of the cassette and measurement stage;
   a film thickness measuring mechanism, arranged inside the housing, for emitting a measurement wave to the thin film on the substrate of the measurement stage, detecting at least one of a reflection wave and an emissive wafer from the thin film, and measuring the thickness of the thin film in a non-contact manner on the basis of detection information; and a filter mechanism, arranged in the housing, for capturing and removing gaseous organic matter from the outside air and supplying the outside air to at least the measurement stage,
   wherein said film thickness measuring mechanism includes an elliptical polarization analyzing apparatus that comprises: a light source; a polarizer for changing light emitted from the light source into linearly polarized light; a 1/4 wavelength plate for changing the linearly polarized light into elliptically polarized and causing this elliptically polarized light to be incident on a thin film obliquely; a detection section for detecting first elliptically polarized light reflected by a surface of the thin film and second elliptically polarized light reflected by a bottom face of the thin film; a reading mechanism for reading a phase difference angle and an amplitude ratio angle with respect to the first and second elliptically polarized lights detected by the detection section; and a determining mechanism for determining a film thickness on the basis of the read phase difference angle and amplitude ratio angle.

2. A film thickness measuring apparatus according to claim 1, further comprising a first exhaust mechanism for discharging ambient atmosphere of the film thickness measuring mechanism.

3. A film thickness measuring apparatus according to claim 2, wherein:
   the film thickness measuring mechanism includes a light source for emitting a measurement wave to the thin film on the substrate, and a detector for detecting a reflection wave reflected from the thin film; and
   the first exhaust mechanism includes a first member and a second member, arranged to surround the light source and the detector, for discharging gases generated from the light source and the detector, respectively.

4. A film thickness measuring apparatus according to claim 1, further comprising a second exhaust mechanism for discharging ambient atmosphere of the measurement stage.

5. The film thickness measuring apparatus according to claim 4, further comprising a first exhaust mechanism having a first member and a second member arranged to surround a light source and a detector, respectively, for discharging gasses generated by the light source and the detector, respectively.

6. The film thickness measuring apparatus according to claim 5, wherein the second exhaust mechanism further comprises a third member arranged to partially surround the measurement stage for discharging gasses away from the measurement stage.

7. The film thickness measuring apparatus according to claim 6, wherein the third member evacuates gases from around the measurement stage in a direction below the measurement stage.

8. A film thickness measuring apparatus according to claim 1, further comprising a pure gas supply mechanism for supplying a pure gas to the substrate placed on the measurement stage.

9. A film thickness measuring apparatus according to claim 1, wherein said film thickness measuring mechanism includes a photoelectric spectroscope that comprises: an X-ray source for irradiating a film under measurement with an X-ray; a counting mechanism for counting photoelectrons emitted from the film, for each of energy levels; a determining mechanism for determining a film thickness on the basis of the number of photoelectrons counted.

10. A film thickness measuring apparatus according to claim 1, wherein said filter mechanism is constructed by a unit that comprises: a fan for sucking the air from a clean room; a chemical filter for capturing gaseous organic matter; and a ULPA filter, said fan, said chemical filter and said ULPA filter being arranged in the order mentioned.

11. A processing apparatus comprising:
    an introduction stage to which a substrate is introduced from an external region;
    a processing section for forming a film on the substrate;
    a conveyor mechanism for conveying the substrate from the introduction stage to the processing section; and
    a measurement section for measuring the thickness of the film on the substrate which is placed in an controlled atmosphere,
    wherein said measurement section includes an elliptical polarization analyzing apparatus that comprises: a light source; a polarizer for changing light emitted from the light source into linearly polarized light; a 1/4 wavelength plate for changing the linearly polarized light into elliptically polarized and causing this elliptically polarized light to be incident on a thin film obliquely; a detection section for detecting first elliptically polarized light reflected by a surface of the thin film and second elliptically polarized light reflected by a bottom face of the thin film; a reading mechanism for reading a phase difference angle and an amplitude ratio angle with respect to the first and second elliptically polarized lights detected by the detection section; and a determining mechanism for determining a film thickness on the basis of the read phase difference angle and amplitude ratio angle.

12. A processing apparatus according to claim 11, further comprising a storage section for storing the substrate introduced into the introduction stage, in the controlled atmosphere.

13. A processing apparatus according to claim 11, wherein said controlled atmosphere includes air obtained by clearing outside air of gaseous organic matter.

14. A substrate processing method comprising:
    sequentially conveying a plurality of substrates to an introduction stage; and
    forming a film on the substrate; and
    measuring film thickness when the substrate is in a controlled atmosphere, wherein measuring film thickness comprises:
        generating a signal of polarized light from a light source;
        changing the signal of polarized light into linearly polarized light;
        changing the linearly polarized light into elliptically polarized light;
        directing the elliptically polarized light to be incident on a thin film obliquely of the substrate;
        detecting first elliptically polarized light reflected by a surface of the thin film and second elliptically polarized light reflected by a bottom face of the thin film;
        reading a phase difference angle and an amplitude ratio angle with respect to the first and second elliptically polarized lights; and
        determining a film thickness on the basis of the read phase difference angle and amplitude ratio angle.

15. A substrate processing method according to claim 14, further comprising:
    controlling processing data based on the measured film thickness, said processing data being used for forming a film on a substrate; and
    forming a film on another substrate based on the controlled processing data.

16. A substrate processing method according to claim 14, further comprising:
    controlling processing data based on the measured film thickness, said processing data being used for processing a substrate on which a film is formed; and
    executing processing with respect to the substrate on which the film is formed.

17. A substrate processing method comprising:
    forming a film on a plurality of substrates wherein similar forming criteria are used for all of the plurality of substrates;
    measuring the thickness of the film formed on at least one of the plurality of substrates, wherein measuring film thickness comprises:
        generating a signal of polarized light from a light source;
        changing the signal of polarized light into linearly polarized light;
        changing the linearly polarized light into elliptically polarized light;
        directing the elliptically polarized light to be incident on a thin film obliquely of the substrate;
        detecting first elliptically polarized light reflected by a surface of the thin film and second elliptically polarized light reflected by a bottom face of the thin film;
        reading a phase difference angle and an amplitude ratio angle with respect to the first and second elliptically polarized lights; and
        determining a film thickness on the basis of the read phase difference angle and amplitude ratio angle; and
    determining which secondary processing should be executed with respect to the plurality of substrates, on the basis of the measured thickness.

18. A substrate processing method according to claim 17, wherein the step of determining which secondary processing should be executed includes executing a subsequent step when the measured thickness of the film is within a predetermined range, and generating a warning signal when the measured thickness of the film is outside the predetermined range.

* * * * *